(12) United States Patent
So et al.

(10) Patent No.: US 11,526,287 B2
(45) Date of Patent: Dec. 13, 2022

(54) STORAGE DEVICE AND OPERATING METHOD OF STORAGE DEVICE

(71) Applicant: SAMSUNG ELECTRONICS CO., LTD., Suwon-si (KR)

(72) Inventors: Hyejeong So, Hwaseong-si (KR); Changkyu Seol, Osan-si (KR); Hong Rak Son, Anyang-si (KR); Pilsang Yoon, Hwaseong-si (KR); Jinsoo Lim, Seoul (KR); Jae Hun Jang, Hwaseong-si (KR); Seonghyeong Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 16/828,170

(22) Filed: Mar. 24, 2020

(65) Prior Publication Data

US 2021/0132832 A1 May 6, 2021

(30) Foreign Application Priority Data

Nov. 1, 2019 (KR) .......................... 10-2019-0138655

(51) Int. Cl.
  *G06F 3/06* (2006.01)
  *G06N 20/00* (2019.01)
  *G06F 13/20* (2006.01)
  *G06N 3/063* (2006.01)

(52) U.S. Cl.
  CPC .......... *G06F 3/0635* (2013.01); *G06F 3/0611* (2013.01); *G06F 3/0659* (2013.01); *G06F 3/0679* (2013.01); *G06F 13/20* (2013.01); *G06N 3/063* (2013.01); *G06N 20/00* (2019.01)

(58) Field of Classification Search
  CPC .... G06F 3/0635; G06F 3/0611; G06F 3/0659; G06F 3/0679; G06F 13/20; G06N 3/063; G06N 20/00
  See application file for complete search history.

(56) References Cited

U.S. PATENT DOCUMENTS

| | | | |
|---|---|---|---|
| 5,511,177 A * | 4/1996 | Kagimasa | G06F 3/0601 711/114 |
| 7,181,548 B2 | 2/2007 | Ellis et al. | |
| 8,447,896 B2 | 5/2013 | Fujimoto | |

(Continued)

OTHER PUBLICATIONS

Donato, Marco, et al. "On-chip deep neural network storage with multi-level eNVM." Proceedings of the 55th Annual Design Automation Conference. 2018. (Year: 2018).*

*Primary Examiner* — Kalpit Parikh
(74) *Attorney, Agent, or Firm* — F. Chau & Associates, LLC

(57) ABSTRACT

A storage device is provided including a memory controller having a neural processing unit (NPU); a first nonvolatile memory (NVM) connected to the memory controller through a first channel; and a second NVM connected to the memory controller through a second channel. The first NVM stores first weight data for the NPU and the second stores second weight data for the NPU. The memory controller is configured to determine one of the first and second channels that is less frequently accessed upon receiving an inference request from the neural processor, and access a corresponding one of the first weight data and the second weight data using the determined one channel.

20 Claims, 17 Drawing Sheets

(56) References Cited

U.S. PATENT DOCUMENTS

| | | | |
|---|---|---|---|
| 8,751,700 | B2 | 6/2014 | Asnaashari et al. |
| 8,918,554 | B2 | 12/2014 | Lai et al. |
| 8,984,182 | B2 | 3/2015 | Zhao et al. |
| 9,128,634 | B1 | 9/2015 | Kang et al. |
| 9,760,281 | B2 | 9/2017 | Ramalingam |
| 2016/0004438 | A1* | 1/2016 | Moon .................... G06F 3/061 |
| | | | 711/103 |
| 2016/0358070 | A1* | 12/2016 | Brothers .............. G06N 3/0454 |
| 2017/0277628 | A1 | 9/2017 | Paul et al. |
| 2018/0300601 | A1 | 10/2018 | Cedola et al. |
| 2019/0129834 | A1 | 5/2019 | Purkayastha et al. |
| 2019/0187898 | A1 | 6/2019 | Gu et al. |
| 2019/0324644 | A1* | 10/2019 | Jin ........................ G06F 3/0679 |
| 2019/0354496 | A1* | 11/2019 | Nielsen .................. G06N 3/084 |
| 2020/0117597 | A1* | 4/2020 | Huang .................. G06N 3/063 |

* cited by examiner

| LBA | PBA | Meta Data |
|---|---|---|
| LBA1 | PBA1 | MD1 |
| LBA2 | PBA2 | MD2 |
| ⋮ | ⋮ | ⋮ |
| LBAn | PBAn | MDn |

FIG. 4

| VA | PBA | | | |
|---|---|---|---|---|
| VA1 | PBAa | CH1 | WAY1 | RMA1 |
| | PBAb | CH2 | WAY1 | RMA2 |

FIG. 7

| VA | PBA | | | |
|---|---|---|---|---|
| VA1 | PBAa | CH1 | WAY1 | RMA1 |
| | PBAb | CH2 | WAY1 | RMA2 |
| VA2 | PBAc | CH1 | WAY2 | RMA3 |
| | PBAd | CH2 | WAY2 | RMA4 |

STORAGE DEVICE AND OPERATING METHOD OF STORAGE DEVICE

CROSS-REFERENCE TO RELATED APPLICATIONS

This U.S. non-provisional patent application claims priority under 35 U.S.C. § 119 to Korean Patent Application No. 10-2019-0138655 filed on Nov. 1, 2019, in the Korean Intellectual Property Office, the disclosure of which is incorporated by reference in its entirety herein.

BACKGROUND

1. Technical Field

Embodiments of the inventive concept described herein relate to a semiconductor device, and more particularly, relate to a storage device that supports reading and writing of user data and performing machine learning-based inferences and an operating method of the storage device.

A machine learning algorithm builds a mathematical model based on training data to make predictions without being explicitly programmed. As technologies for machine learning develop, attempts have been made to apply machine learning to real life.

Most electronic devices include storage devices. For example, a storage device may include nonvolatile memory with a high-capacity. The storage device may be implemented in various forms such as a solid state drive, a hard disk drive, a memory card, and a memory package. A storage device can store machine learning data such as the training data and the models built from the training data, or user data.

However, when the storage device is used to store both machine learning data and user data, a speed at which the user data is read or written may decrease.

SUMMARY

At least one exemplary embodiment of the inventive concept provides a storage device that prevents a decrease in a speed at which user data are read or written while supporting a machine learning function and an operating method of the storage device.

According to an exemplary embodiment of the inventive concept, a storage device is provided including a memory controller having a neural processing unit (NPU); a first nonvolatile memory (NVM) connected to the memory controller through a first channel; and a second NVM connected to the memory controller through a second channel. The first NVM stores first object data for the NPU and the second stores second object data for the NPU. The memory controller is configured to determine one of the first and second channels that is less frequently accessed upon receiving a request from the neural processing unit, and access a corresponding one of the first object data and the second object data using the determined one channel. The object data includes weight data, game data, operating system data. The request includes a learning request and an inference request.

According to an exemplary embodiment of the inventive concept, a memory controller is provided that includes a data bus; a neural processing unit (NPU) connected to the data bus; a first memory manager connected to the data bus and a first channel; a second memory manager connected to the data bus and a second channel; a first nonvolatile memory (NVM) device connected to the first channel, the first NVM storing first weight data for the NPU; a second NVM device connected to the second channel, the second NVM storing second weight data for the NPU; and a third memory manager connected to the NPU and a third NVM device storing third weight data for the NPU. The NPU attempts to access the third weight data using the third memory manager upon receiving an inference request from a host device. The memory controller attempts to access the first weight using the first memory manager or the second weight data using the second memory manager when the NPU is unable to access the third weight data.

According to an exemplary embodiment of the inventive concept, a method for operating a storage device including a memory controller and a neural processor is provided. A first nonvolatile memory (NVM) is connected to the memory controller through a first channel and a second NVM is connected to the memory controller through a second channel. The method includes: receiving, by the memory controller, a request from a host device; determining, by the memory controller, whether the request requires accessing weight data for the neural processor; processing, by the neural processor, the request when it is determined that the request does not require accessing the weight data; and selecting, by the memory controller, one of the channels that is less frequently accessed and accessing the weight data using the selected channel when it is determined that the request requires accessing the weight data.

BRIEF DESCRIPTION OF THE FIGURES

The inventive concept will become apparent by describing in detail exemplary embodiments thereof with reference to the accompanying drawings.

FIG. 4 illustrates an example of a second mapping table to which an arbiter refers.

FIG. 7 illustrates an example of a second mapping table to which a scheduler of FIG. 6 refers.

DETAILED DESCRIPTION OF THE EXEMPLARY EMBODIMENTS

Below, exemplary embodiments of the inventive concept are described in detail and clearly to such an extent that one of an ordinary skill in the art can implement the inventive concept.

Figure 1:
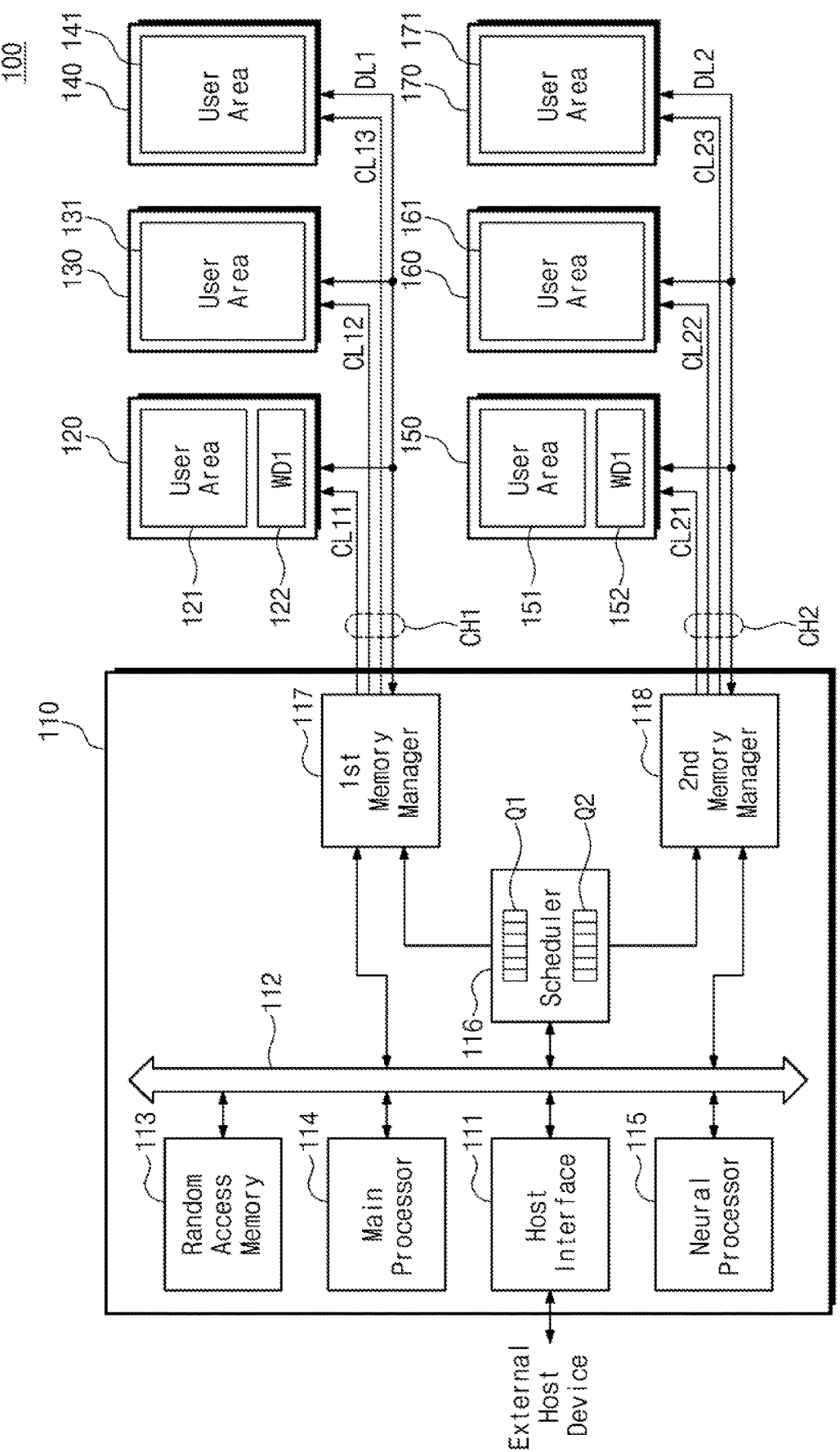
FIG. 1 is a block diagram illustrating a storage device according to an exemplary embodiment of the inventive concept.

FIG. 1 is a block diagram illustrating a storage device 100 according to an exemplary embodiment of the inventive concept. Referring to FIG. 1, the storage device 100 includes a controller 110 (e.g., a control circuit), first to third nonvolatile memory devices 120 to 140, and fourth to sixth nonvolatile memory devices 150 to 170. The first to sixth nonvolatile memory devices 120 to 170 may include, for example, flash memory devices, phase change memory devices, magnetic memory devices, ferroelectric memory devices, and resistive memory devices.

The controller 110 is connected with the first to third nonvolatile memory devices 120 to 140 through a first channel CH1. The controller 110 may be connected in common with the first to third nonvolatile memory devices 120 to 140 through first data lines DL1 of the first channel CH1. The first data lines DL1 may be used to transfer a command and an address to the first to third nonvolatile memory devices 120 to 140 and to exchange data with the first to third nonvolatile memory devices 120 to 140.

The controller 110 may transfer control signals to the first to third nonvolatile memory devices 120 to 140 through control lines CL11 to CL13 of the first channel CH1. For example, some of the control lines CL11 to CL13 may be connected in common to the first to third nonvolatile memory devices 120 to 140 and may provide relevant control signals to the first to third nonvolatile memory devices 120 to 140. For example, some of the control lines CL11 to CL13 may transfer control signals in both directions or in a reverse direction of the direction of the arrows.

The controller 110 is connected with the fourth to sixth nonvolatile memory devices 150 to 170 through a second channel CH2. The second channel CH2 may include second data lines DL2 and control lines CL21 to CL23. The second data lines DL2 may perform functions similar to the first data line DL1, and functions of the control lines CL21 to CL23 may be similar to the functions of the control lines CL11 to CL13. Thus, additional description will be omitted to avoid redundancy.

In an embodiment, the controller 110 classifies nonvolatile memory devices connected to the same channel into ways. For example, the first nonvolatile memory device 120 is classified into a first way of the first channel CH1, the second nonvolatile memory device 130 is classified into a second way of the first channel CH1, and the third nonvolatile memory device 140 is classified into a third way of the first channel CH1. For example, the fourth nonvolatile memory device 150 is classified into a first way of the second channel CH2, the fourth nonvolatile memory device 150 is classified into a first way of the second channel CH2, the fifth nonvolatile memory device 160 is classified into a second way of the second channel CH2, and the sixth nonvolatile memory device 170 is classified into a third way of the second channel CH2.

The controller 110 may access different channels (e.g., CH1 and CH2) independently of each other. For example, the controller 110 may perform an access to the first channel CH1 while the second channel CH2 is being accessed or regardless of the access to the second channel CH2.

Depending on an access request of an external host device, user data may be written to or read from the first to sixth nonvolatile memory devices 120 to 170 under control of the controller 110. The user data may be data that is read-requested or write-requested (or will be read-requested or write-requested) by the external host device. That is, the user data may be data of the storage device 100, which the external host device is able to access. The user data may include data of the external host device, such as an operating system and an application.

In an exemplary embodiment, the controller 110 is configured to perform a machine learning-based inference (or learning) depending on an inference (or learning) request of the external host device. Weight data (or synapse data) to implement a neural network may be used to perform the machine learning-based inference (or learning). The controller 110 may store the weight data in the first to sixth nonvolatile memory devices 120 to 170 and may read the weight data when necessary. An artificial neuron is the basic unit of a neural network. A perceptron is a type of artificial neuron which takes in several binary inputs and produces a single binary output from the inputs. For example, the perceptron could apply a linear mathematical operation to the inputs to generate the output that indicates whether the inputs are to be classified as corresponding to a certain event. An input that is more important for predicting the certain event could have weight data having a higher value so that it contributes more to the prediction than another one of the inputs.

The controller 110 may divide a storage space of the first to third nonvolatile memory devices 120 to 140 of the first channel CH1 into user areas 121, 131, and 141 and a weight area 122. The controller 110 may designate the weight area 122 as an area that the external host device fails to access arbitrarily. For example, the weight area 122 is dedicated to only storing weight data or other data used in a machine learning algorithm such as training data or a model built from the training data. The controller 110 may notify the external host device that the storage space of the user areas 121, 131, and 141 is an accessible storage space. For example, the controller 110 could inform the host device of the addresses, ways, and channels necessary to access the corresponding user areas.

In an embodiment, the controller 110 may designate, as the storage space of the user areas 121, 131, and 141, the remaining space of the storage space of the first to third nonvolatile memory devices 120 to 140 other than the following: areas necessary to improve the performance of the storage device 100, such as an overprovision area and a reserved area, and an area necessary to manage the storage device 100, such as a meta area. While FIG. 1 shows that each of the channels includes two memory devices for storing user data without weight data, the inventive concept is not limited thereto. For example, in an alternate embodiment, nonvolatile memory devices 140 and 170 are omitted, or each of the channels includes more than two memory device for storing user data without weight data.

An example is illustrated in FIG. 1 of the controller 110 designating the weight area 122 at the first nonvolatile memory device 120. However, the controller 110 may designate a weight area at any other nonvolatile memory device or may designate a weight area so as to be distributed into two or more nonvolatile memory devices.

Like the first channel CH1, the controller 110 may divide a storage space of the fourth to sixth nonvolatile memory devices 150 to 170 of the second channel CH2 into user areas 151, 161, and 171 and a weight area 152. The controller 110 may designate a weight area at one nonvolatile memory device or two or more nonvolatile memory devices of the second channel CH2.

In an exemplary embodiment, the controller 110 stores first weight data WD1 in the weight area 122 of the first channel CH1 and stores the same first weight data WD1 in the weight area 152 of the second channel CH2. The first weight data WD1 of the second channel CH2 may be a replica of the first weight data WD1 of the first channel CH1, and vice versa.

In an exemplary embodiment, when an access request of the external host device is focused on the first channel CH1 and it is necessary to read the first weight data WD1, the controller 110 reads the first weight data WD1 from the weight area 152 of the second channel CH2. In an exemplary embodiment, when an access request of the external host device is focused on the second channel CH2 and it is necessary to read the first weight data WD1, the controller 110 reads the first weight data WD1 from the weight area 122 of the first channel CH1. For example, when accesses to the first channel CH1 for data of a user area during a given time period exceed a certain threshold and the first weight data WD1 is needed, the weight data WD1 can be retrieved from the weight area 152 of the second channel CH2. For example, when accesses to the second channel CH2 for data of a user area during a given time period exceed a certain threshold and the first weight data WD1 is needed, the weight data WD1 can be retrieved from the weight area 122 of the first channel CH1.

When it is necessary to read the first weight data WD1, the controller 110 may be configured to read the first weight data WD1 from a colder channel, that is, from a channel on which access requests of the external host device are less focused. Accordingly, the controller 110 may support the machine learning-based inference (or learning) while preventing a decrease in a speed at which the access requests of the external host device are processed. For example, a colder channel may be less frequently accessed than a hotter channel. For example, a colder channel may be less frequently accessed for non-weight data than a hotter channel.

The controller 110 may include a host interface 111 (e.g., an interface circuit), a bus 112, a random access memory 113, a main processor 114, a neural processor 115, a scheduler 116 (e.g., a scheduling circuit), a first memory manager 117 (e.g., a memory managing circuit), and a second memory manager 118 (e.g., a memory managing circuit). In an exemplary embodiment, the neural processor 115 is a specialized circuit that implements all the necessary control and arithmetic logic necessary to execute machine learning algorithms. The neural processor 115 may be implemented by a neural processing unit (NPU).

The host interface 111 may receive a request from the external host device. When the received request is an access request, the host interface 111 may transfer the access request to the main processor 114. When the received request is an inference (or learning) request (hereinafter, the term "learning" may be omitted, but the term "inference" may be equivalently exchanged with the term "learning"), the host interface 111 may transfer the inference request to the neural processor 115.

When the access request is a write request, the access request may accompany the user data for a write operation. The host interface 111 may temporarily store the user data in the random access memory 113 and may inform the main processor 114 of a storage position of the user data in the random access memory 113. When the access request is a read request, the host interface 111 may output data, which is stored in the random access memory 113 after being read from one or more of the first to sixth nonvolatile memory devices 120 to 170 or one or more of the first to sixth nonvolatile memory devices 120 to 170, to the external host device.

The inference request may accompany the inference data (or equivalently learned data). The host interface 111 may temporarily store the inference data in the random access memory 113 and may inform the neural processor 115 of a storage position of the inference data in the random access memory 113. The host interface 111 may output a result of the inference stored in the random access memory 113 to the external host device.

The bus 112 may provide communication channels between components in the controller 110. Unless differently mentioned, the communication between the components in the controller 110 may be made through the bus 112. The random access memory 113 may be used as a main memory, a system memory, a working memory, a buffer memory, a cache memory, or a register of the controller 110.

The main processor 114 may receive an access request for a storage space from the host interface 111. The access request may be based on a logical address LBA. The main processor 114 may convert the access request based on the logical address LBA of the external host device, into a command and an address based a physical address PBA of one or more of the first to sixth nonvolatile memory devices 120 to 170.

For example, the main processor 114 may convert the access request based on the logical address LBA into the command and the address based on the physical address PBA by using a mapping table that is kept in a meta area of one or more of the first to sixth nonvolatile memory devices 120 to 170 and is loaded onto the random access memory 113.

Figures 2, 3:
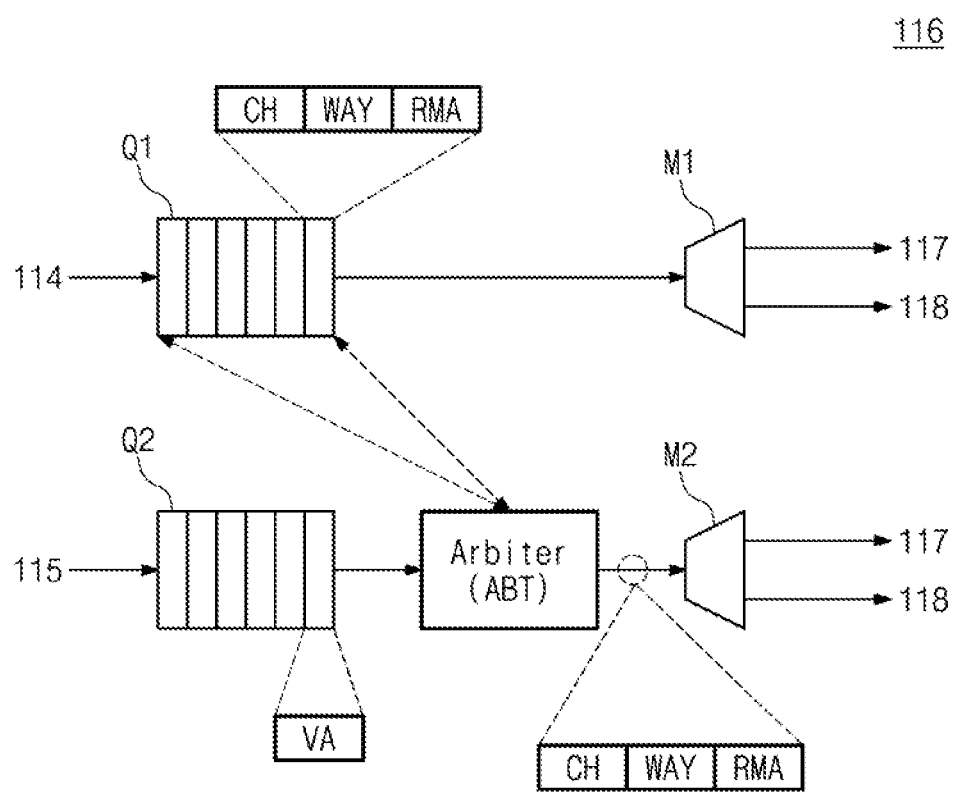
FIG. 2 illustrates an example of a mapping table to which a main processor refers.
FIG. 3 illustrates an example of a scheduler.

FIG. 2 illustrates an example of a mapping table to which the main processor 114 refers. Referring to FIGS. 1 and 2, the mapping table may include first to n-th logical addresses LBA1 to LBAn as the logical address LBA and may include first to n-th physical addresses PBA1 to PBAn respectively corresponding to the first to n-th logical addresses LBA1 to LBAn as the physical address PBA.

The mapping table may further include first to n-th meta data MD1 to MDn respectively corresponding to the first to n-th physical addresses PBA1 to PBAn as meta data MD. Each of the first to n-th meta data MD1 to MDn may include a variety of information representing distinct characteristics of physical storage spaces of the first to sixth nonvolatile memory devices 120 to 170 such as a program/erase count, an address of a bad area, a program or erase timestamp, and a read count.

Returning to FIG. 1, the main processor 114 may transfer the converted command and address to the scheduler 116 (e.g., a scheduling circuit). For example, the converted command and address may be enqueued into a first queue Q1 of the scheduler 116.

The neural processor 115 may determine whether the inference request received through the host interface 111 requires reading of the first weight data WD1. When the inference request requires reading of the first weight data WD1, the neural processor 115 may generate a weight data read request for reading the first weight data WD1.

For example, since the first weight data WD1 is stored in the first nonvolatile memory device 120 and the fourth nonvolatile memory device 150, a virtual address (VA) for identifying the first weight data WD1 may be designated. The virtual address may become known to the neural processor 115. The neural processor 115 may generate the weight data read request by using the virtual address. The weight data read request may be enqueued into a second queue Q2 of the scheduler 116. The weight data read request may include a weight data read command and the virtual address.

The scheduler 116 may include the first queue Q1 into which a read or write command and an address from the main processor 114 are enqueued and the second queue Q2 into which the weight data read command and the virtual address from the neural processor 115 are enqueued. The scheduler 116 may perform scheduling (e.g., position changing) that are based on priorities of the read or write commands, in the first queue Q1.

The scheduler 116 may classify channels of the first to sixth nonvolatile memory devices 120 to 170, that is, the first channel CH1 and the second channel CH2 into a colder channel and a hotter channel, based on commands and addresses pending in the first queue Q1.

For example, when the number of commands and addresses associated with the first channel CH1 from among commands (including various commands such as read or write commands) and addresses pending in the first queue Q1 is more than the number of commands and addresses associated with the second channel CH2 from among the pending commands and addresses, the first channel CH1 may be selected (or classified) as a hotter channel, and the second channel CH2 may be selected (or classified) as a colder channel.

In contrast, when the number of commands and addresses associated with the first channel CH1 from among the commands and the addresses pending in the first queue Q1 is less than the number of commands and addresses associated with the second channel CH2 from among the pending commands and addresses, the first channel CH1 may be selected (or classified) as a colder channel, and the second channel CH2 may be selected (or classified) as a hotter channel.

The scheduler 116 may translate (or generate) a command and an address from the neural processor 115, which are pending in the second queue Q2, into a command and an address for the first to sixth nonvolatile memory devices 120 to 170, based on hotness and coldness of the first channel CH1 and the second channel CH2.

For example, the scheduler 116 may translate a command and an address from the neural processor 115 into a command and an address for a colder channel. This may make it possible to process commands from the neural processor 115 while preventing an increase in latency when the storage device 100 processes commands from the external host device.

The scheduler 116 may transfer commands and addresses pending in the first queue Q1 to the first memory manager 117 and may transfer commands and addresses generated from the second queue Q2 to the second memory manager 118.

The first memory manager 117 may transfer commands and addresses transferred from the scheduler 116 to the first to third nonvolatile memory devices 120 to 140 through the control lines CL11 to CL13 of the first channel CH1. The first memory manager 117 may transfer data stored in the random access memory 113 to the first to third nonvolatile memory devices 120 to 140 through the first data lines DL1 in response to commands and addresses (e.g., during a data input cycle).

Alternatively, the first memory manager 117 may store data received from the first to third nonvolatile memory devices 120 to 140 through the first data lines DL1 in the random access memory 113 in response to commands and addresses (e.g., during a data output cycle). With regard to the second channel CH2, the second memory manager 118 may perform the same functions as the first memory manager 117.

In an embodiment, the description is given with reference to FIG. 1 as the storage device 100 includes two channels. However, the storage device 100 may include three or more channels. The storage device 100 may store the same weight data in weight areas of two or more channels. Alternatively, at least one channel of two or more channels of the storage device 100 may be configured not to include a weight area.

In an embodiment, the first to sixth nonvolatile memory devices 120 to 170 may include memory devices, which process an access to sequential storage spaces more quickly, such as flash memory devices. The weight areas 122 and 152 may be designated as storage spaces corresponding to physically sequential addresses (e.g., physical addresses of the first to sixth nonvolatile memory devices 120 to 170) and may support a faster access to the first weight data WD1.

FIG. 3 illustrates an example of the scheduler 116. Referring to FIGS. 1 and 3, the scheduler 116 may include the first queue Q1, the second queue Q2, an arbiter ABT (e.g., an arbiter circuit), a first multiplexer M1, and a second multiplexer M2.

The first queue Q1 may store commands and addresses from the main processor 114. Each of the addresses of the first queue Q1 may include an address including channel information CH, way information WAY, and a residual address RMA.

The second queue Q2 may store commands and addresses from the neural processor 115. Each of the addresses of the second queue Q2 may include a virtual address VA indicating weight data (e.g., the first weight data WD1).

The arbiter ABT may fetch one of pairs of commands and addresses pending in the second queue Q2 based on a FIFO manner or a priority management manner. The arbiter ABT may determine a hotter channel and a colder channel with reference to the channel information CH of the addresses of the first queue Q1. For example, the arbiter ABT may retrieve information from each cell of the first queue Q1 to determine how many pending commands correspond to the first channel CH1 and how many pending commands correspond to the second channel CH2. For example, if there are more pending commands for the first channel CH1, the arbiter ABT can conclude that the first channel CH1 is hotter and the second channel CH2 is colder.

The arbiter ABT may translate a command and an address fetched from the second queue Q2 into a command and an address for a colder channel. For example, the arbiter ABT may translate a command and an address fetched from the second queue Q2 into a command and an address for a colder channel, by using a second mapping table stored in internal storage or external storage (e.g., the random access memory 113).

FIG. 4 illustrates an example of a second mapping table to which the arbiter ABT refers. Referring to FIGS. 1, 3, and 4, the second mapping table may include the virtual address VA, and information of the physical address PBA mapped onto the virtual address VA. In an embodiment, the virtual address VA may include a first virtual address VA1 indicating the first weight data WD1. The first virtual address VA1 may be a range of values indicating the weight areas 122 and 152 where the first weight data WD1 are stored, or one value (e.g., an identification number). While FIG. 4 only shows a single virtual address entry (VA1), the table may include multiple such entries.

The second mapping table may include two or more physical addresses corresponding to the first virtual address VA1, for example, an a-th physical address PBAa and a b-th physical address PBAb. The a-th physical address PBAa and the b-th physical address PBAb may be values indicating the weight areas 122 and 152, or each of the a-th physical address PBAa and the b-th physical address PBAb may be at least one value (e.g., a start or last address and/or a size value of each of the weight areas 122 and 152).

For example, the a-th physical address PBAa may correspond to the weight area 122 of the first nonvolatile memory device 120 of the first channel CH1, and may include information indicating the first channel CH1, information indicating a first way WAY1, and a first residual address RMA1 indicating a position of the weight area 122 in the first nonvolatile memory device 120.

The b-th physical address PBAb may correspond to the weight area 152 of the fourth nonvolatile memory device 150 of the second channel CH2, and may include information indicating the second channel CH2, information indicating the first way WAY1, and a second residual address RMA2 indicating a position of the weight area 152 in the fourth nonvolatile memory device 150.

The arbiter ABT may select the a-th physical address PBAa when the first channel CH1 is a colder channel and may select the b-th physical address PBAb when the second channel CH2 is a colder channel. The arbiter ABT may generate commands and addresses that are based on the selected physical address.

Returning to FIGS. 1 and 3, like the first queue Q1, an address that is generated (or translated) by the arbiter ABT may include the channel information CH, the way information WAY, and the residual address RMA.

The first multiplexer M1 may transfer a pair of a command and an address to one of the first memory manager 117 and the second memory manager 118, based on the channel information CH of an address and a command fetched from the first queue Q1.

The second multiplexer M2 may transfer a pair of a command and an address to one of the first memory manager 117 and the second memory manager 118, based on channel information CH of an address and a command output from the arbiter ABT.

In an embodiment, the arbiter ABT may be changed to transfer a pair of a command and an address to the first multiplexer M1 instead of the second multiplexer M2, and thus, the second multiplexer M2 may be omitted from the scheduler 116.

In an embodiment, the description is given with reference to FIGS. 1 and 3 as pairs of commands and addresses corresponding to the two channels CH1 and CH2 are enqueued in common into the first queue Q1. However, a queue for pairs of commands and addresses of the first channel CH1 and a queue for pairs of commands and addresses of the second channel CH2 may be provided independently of each other.

The arbiter ABT may translate a pair of a command and an address from the neural processor 115 into a pair(s) of a command(s) and an address(es) for a colder channel, and may enqueue the pair(s) of the command(s) and the address(es) thus translated into a queue of pairs of commands and addresses, which is allocated to a colder channel. That is, pairs of commands and addresses generated by an access request of the external host device and pairs of commands and addresses generated by a request of the neural processor 115 may be managed at the same queue.

In an embodiment, when the pair(s) of the command(s) and the address(es) thus translated is enqueued, the pair(s) of the command(s) and the address(es) thus translated may be designated to have a priority lower than, higher than, or substantially identical to priorities of pairs of commands and addresses generated by an access request.

Figure 5:
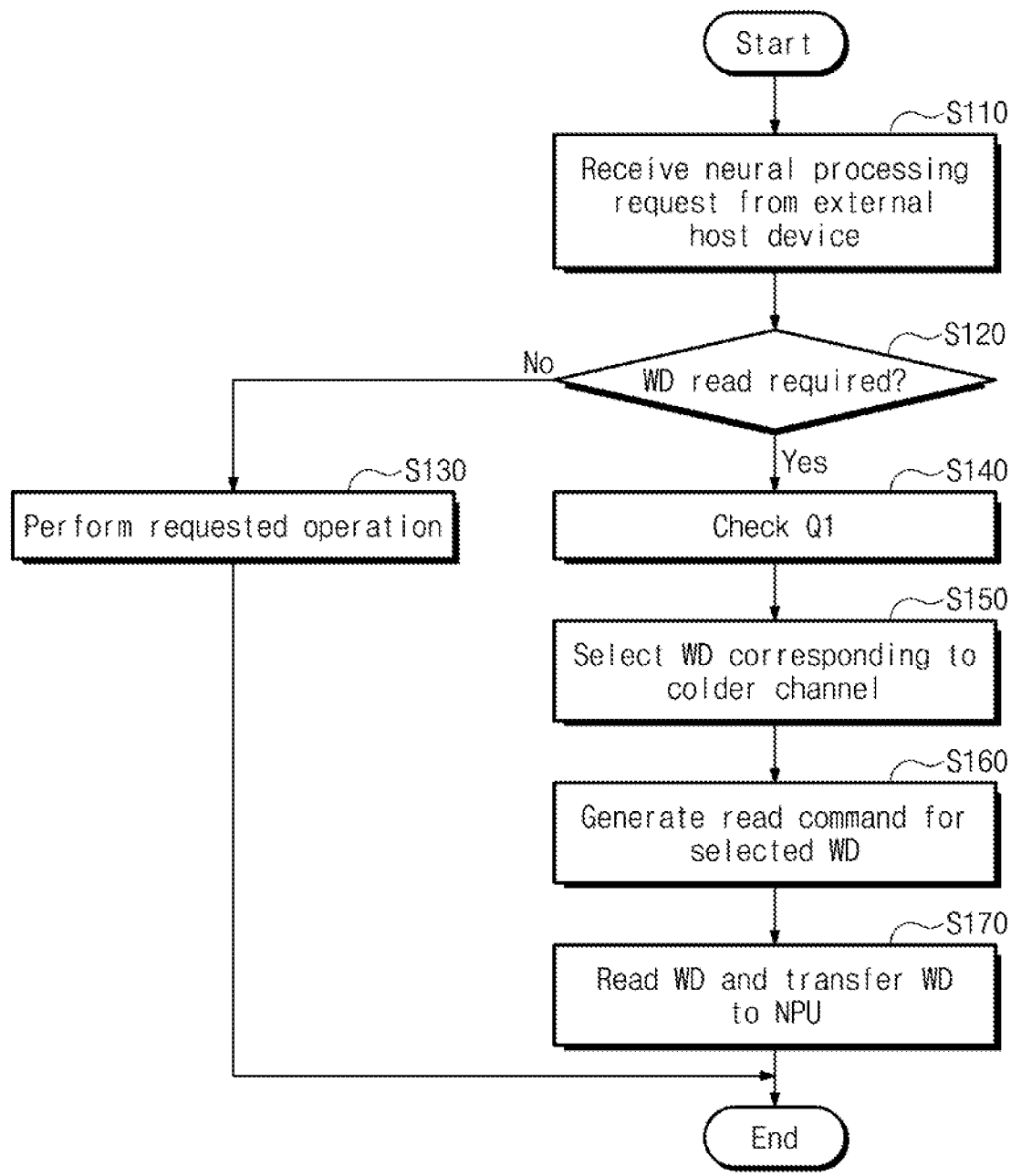
FIG. 5 is a flowchart illustrating an operating method of a storage device according to an exemplary embodiment of the inventive concept.

FIG. 5 is a flowchart illustrating an operating method of the storage device 100 of FIG. 1 according to an exemplary embodiment of the inventive concept. An example in which the storage device 100 performs operations associated with the neural processor 115 is illustrated in FIG. 5. Separately from (independently of or in parallel with) the example illustrated in FIG. 5, the storage device 100 may perform a read operation, a write operation, or an erase operation depending on an access request of the external host device.

Referring to FIGS. 1 and 5, in operation S110, the storage device 100 receives a neural processing request from the external host device. The neural processing request may allow the external host device to require that the storage device 100 perform an operation for the neural processor 115, which is different from a legacy operation such as a read operation, a write operation, or an erase operation.

For example, the neural processing request may include a request for writing (or updating) the first weight data WD1 in the weight areas 122 and 152, a request for reading the first weight data WD1 and loading the first weight data WD1 onto the neural processor 115, a request for inputting (or storing) inference data (or sample data), an inference (or learning) request, a request for obtaining a result of the inference (or learning), and a request including at least two of combinations of the functions listed above such as writing, reading, loading, inputting, inferring, obtaining, etc. The neural processing request may be transferred to the neural processor 115. The sample data may be training data that is used to train a classifier or a neural network to perform a prediction based on certain input data. The inference request may be used to generate a prediction based on certain input data. For example, the inference request could include the input data and an identifier to identify a particular machine learning algorithm, neural network, or classifier to apply to the input data to generate the prediction. The request for obtaining a result of the inference could provide one or more predictions generated by a particular machine learning algorithm, neural network, or classifier. For example, the request for obtaining the result of the inference could include an identifier to identify a particular machine learning algorithm, neural network, or classifier whose predictions to retrieve.

In operation S120, the neural processor 115 determines whether the neural processing request requires reading weight data. For example, when loading the first weight data WD1 stored in the weight areas 122 and 152 of the first to sixth nonvolatile memory devices 120 to 170 onto the neural processor 115 is required depending on the neural processing request, it may be determined that the neural processing request requires reading the first weight data WD1.

When it is determined that the neural processing request does not require reading of the first weight data WD1, in operation S130, the neural processor 115 performs an operation corresponding to the neural processing request. For example, an operation corresponding to a neural processing request that does not require reading weight data could include a pre-processing operation on input data that is to be input to a neural network or a post-processing operation performed on data output by the neural network. When it is determined that the neural processing request requires reading of the first weight data WD1, the neural processor 115 may generate a command and an address for reading the first weight data WD1 and may enqueue the command and the address into the second queue Q2. For example, the read first weight data WD1 may be used to set weights of neurons within the neural network, so when the input data is subsequently applied to the neural network, the neural network applies these weights to the input data to make a prediction. Further, the process of making the prediction may cause these weights to change and the changed weights may be stored as the first weight data WD1.

In operation S140, the scheduler 116 checks the first queue Q1 to determine a colder channel of the first channel CH1 and the second channel CH2. For example, the scheduler 116 may generate a first count of the pending commands in the first queue Q1 for the first channel CH1, generate a second count of the pending commands in the first queue Q1 for the first channel CH1, determine the first channel CH1 to be the colder channel when the first count is lower than the second count, and determine the second channel CH2 to be the colder channel when the second count is lower than the first count. When the first and second counts are the same, the scheduler 116 may randomly select one of the two channels to be the colder channel. The scheduler 116 may select weight data corresponding to the colder channel as a read target.

In operation S150, the scheduler 116 selects weight data corresponding to the colder channel as a read target.

In operation S160, the scheduler 116 generates a read command for the selected weight data. The scheduler 116 may generate a pair of the read command and an address for the selected weight data. For example, if the second channel is the colder channel, the address may correspond to the location of the first weight data WD1 in the fourth nonvolatile memory device 150. The scheduler 116 may transfer the generated read command and address to a memory manager (e.g., 118) of the selected channel to enable the first weight data WD1 to be read.

In operation S170, the memory manager reads the first weight data WD1 and transfers the read data to the neural processor 115. For example, the memory manager of the selected channel may directly transfer the first weight data WD1 to the neural processor 115. In another example, the memory manager of the selected channel may store the first weight data WD1 at a given address of the random access memory 113. The neural processor 115 may read and obtain the first weight data WD1 from a storage space of the random access memory 113 corresponding to the given address.

Figure 6:
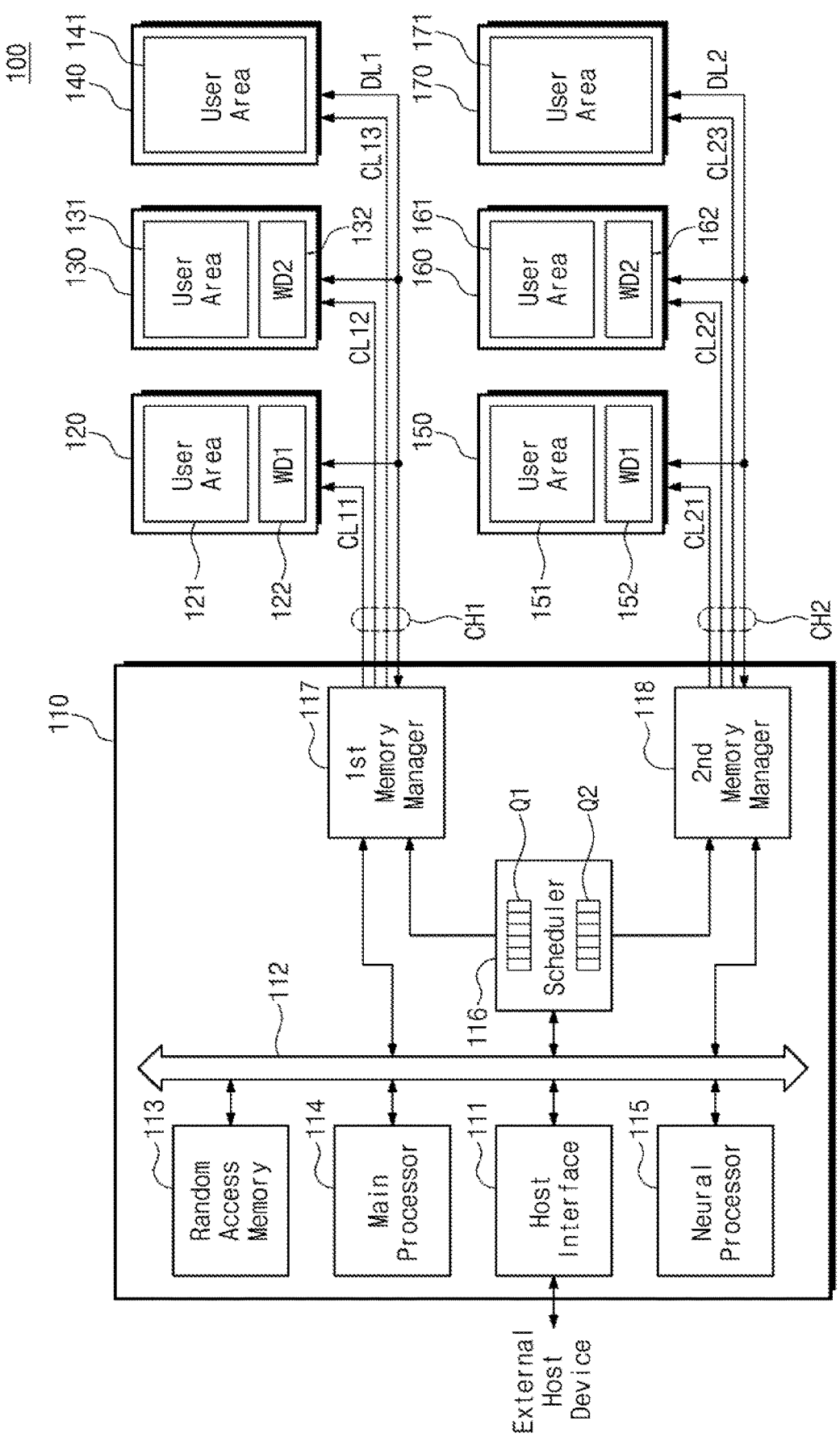
FIG. 6 illustrates an example in which two weight data are stored in first to sixth nonvolatile memory devices.

FIG. 6 illustrates an example in which two weight data WD1 and WD2 are stored in the first to sixth nonvolatile memory devices 120 to 170. Referring to FIG. 6, the first weight data WD1 may be stored in the weight area 122 of the first nonvolatile memory device 120 of the first channel CH1 and the weight area 152 of the fourth nonvolatile memory device 150 of the second channel CH2, respectively. For example, when the scheduler 116 receives a request from the neural processor 115 to store weight data associated with neurons of a certain neural network, the scheduler 116 can store the weight data in weight area 122 and weight area 152.

Also, the second weight data WD2 may be stored in a weight area 132 of the second nonvolatile memory device 130 of the first channel CH1 and a weight area 162 of the fifth nonvolatile memory device 160 of the second channel CH2, respectively.

The first weight data WD1 and the second weight data WD2 may be weight data that are used by different models. For example, the first weight data WD1 may be weight data for an image recognition model. When the first weight data WD1 is loaded onto the neural processor 115, the neural processor 115 may perform inference (or learning) for image recognition.

For example, the second weight data WD2 may be weight data for a voice recognition model. When the second weight data WD2 is loaded onto the neural processor 115, the neural processor 115 may perform inference (or learning) for voice recognition.

In the case where the first weight data WD1 and the second weight data WD2 corresponding to two or more models are stored in the first to sixth nonvolatile memory devices 120 to 170, it may be necessary to read weight data whenever a model is changed depending on a request of the external host device. For example, if the neural processor 115 just performed an operation for a first machine learning algorithm using the first weight data WD1, and next receives a request from the host device to perform an operation for a second other machine learning algorithm, the second weight data WD2 would need to be loaded to the neural processor 115. Even though the number of times that weight data is read increases, the storage device 100 according to an embodiment of the inventive concept may prevent the latency of an access of the external host device from increasing.

In an example illustrated in FIG. 6, the first weight data WD1 and the second weight data WD2 are stored in weight areas of different nonvolatile memory devices. However, the first weight data WD1 and the second weight data WD2 may be stored together in one weight area belonging to a particular nonvolatile memory device.

FIG. 7 illustrates an example of a second mapping table to which the scheduler 116 of FIG. 6 refers. Compared with the second mapping table of FIG. 4, the second mapping table of FIG. 7 may further include mapping information of a second virtual address VA2 indicating the second weight data WD2, in addition to the mapping information of the first virtual address VA1 indicating the first weight data WD1. For example, the first virtual address VA1 may be associated with a first machine learning algorithm or operation and the second virtual address may be associated with a second other machine learning algorithm or operation. For example, the neural processor 115 may provide the scheduler 116 with the virtual address corresponding to the machine learning algorithm or operation it needs to perform.

The second virtual address VA2 may be mapped onto a c-th physical address PBAc and a d-th physical address PBAd. The c-th physical address PBAc may include information of the first channel CHL information of a second way WAY2, and a third residual address RMA3 indicating the weight area 132 in the second nonvolatile memory device 130. The d-th physical address PBAd may include information of the second channel CH2, information of the second way WAY2, and a fourth residual address RMA4 indicating the weight area 162 in the fifth nonvolatile memory device 160.

When the neural processor 115 generates a read command and an address of the first virtual address VA1, the scheduler 116 may select a physical address corresponding to a colder channel from among the a-th physical address PBAa and the b-th physical address PBAb and may generate a pair of a read command and an address based on the selected physical address.

When the neural processor 115 generates a read command and an address of the second virtual address VA2, the scheduler 116 may select a physical address corresponding to a colder channel from among the c-th physical address PBAc and the d-th physical address PBAd and may generate a pair of a read command and an address based on the selected physical address.

Figure 8:
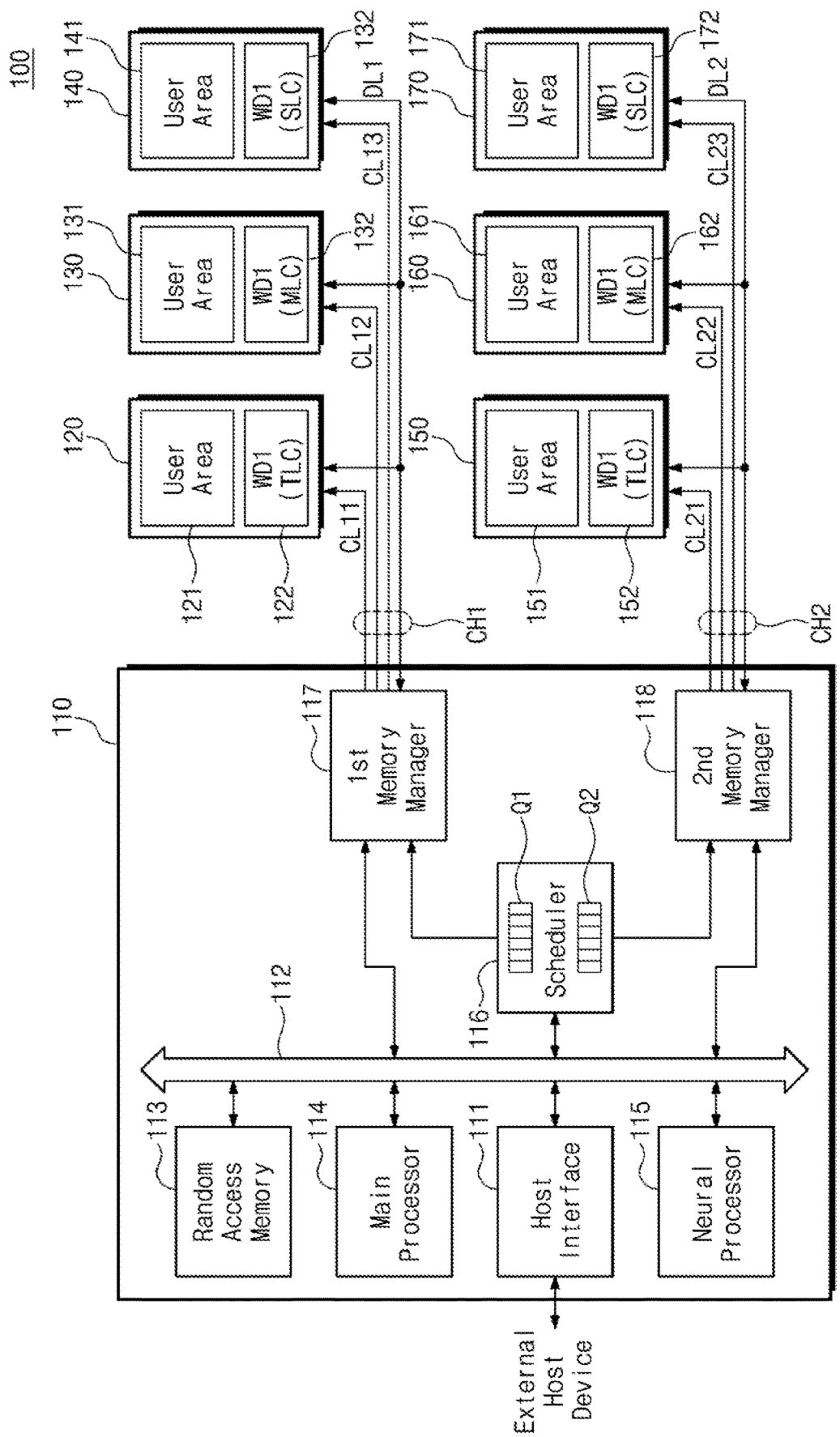
FIG. 8 illustrates an example in which weight data are stored in storage spaces having different characteristics.

FIG. 8 illustrates an example in which the weight data WD1 is stored in storage spaces having different characteristics. Referring to FIG. 8, memory cells of the weight areas 122 and 152 of the first and fourth nonvolatile memory devices 120 and 150 are designated as triple level cells (TLC). Memory cells of the weight areas 132 and 162 of the second and fifth nonvolatile memory devices 130 and 160 are designated as dual-level cells (MLC). Memory cells of weight areas 142 and 172 of the third and sixth nonvolatile memory devices 140 and 170 are designated as single level cells (SLC).

In an embodiment, a weight area of triple level cells of each channel, a weight area of dual-level cells of each channel, and a weight area of single level cells of each channel are configured to store replicas of the first weight data WD1 identically. A weight area of an appropriate characteristic (e.g., triple level cells, dual-level cells, or single level cells) may be selected depending on a work load of the selected channel, for example, the number of pending commands.

For example, the single level cells SLC may support reading one page of data at the highest speed. The dual-level cells MLC may require a read time longer than the single level cells SLC but may provide more data (e.g., being two times more than data of the single level cell) in response to one read command. The triple level cells TLC may require a read time longer than the dual-level cells MLC but may provide more data (e.g., being 1.5 times more than data of the dual-level cell) in response to one read command. For example, if the work loads of the selected channel are a first amount<a second amount<a third amount, then the weight data can be read from the triple level cells when the work load is the first amount, the weight data can be read from the dual-level cells when the work load is the second amount, and the weight data can be read from the single level cells when the work load is the third amount.

A time taken for the controller 110 to read data from the first to sixth nonvolatile memory devices 120 to 170, for example, times taken to perform operations of transferring a read command and an address, performing a read operation, programming a direct memory access (DMA), and fetching read data may vary depending on characteristics of components of the storage device 100 and a process.

The scheduler 116 may reflect a characteristic of the storage device 100 and may store a characteristic (e.g., triple level cells, dual-level cells, or single level cells) of a weight area preferred depending on a work load as a policy. The scheduler 116 may select a weight area of an appropriate characteristic based on a work load of a selected channel (i.e., a closer channel) and the policy.

As described with reference to FIGS. 4 and 7, the scheduler 116 may refer to the second mapping table. The second mapping table may map physical addresses of weight areas having different characteristics (e.g., triple level cells, dual-level cells, or single level cells) onto one virtual address indicating one weight data. For example, the second mapping table could include a first entry for a first virtual address for the first weight data WD1 stored in the triple level cells, a second entry for a second virtual address for the first weight data WD1 stored in the dual-level cells, and a third entry for a third virtual address for the first weight data WD1 stored in the single level cells.

In an embodiment, as described with reference to FIG. 6, two or more replicas of weight data may be respectively stored in weight areas of the first and second channels CH1 and CH2. For example, the first entry of the second mapping table associated with weight data stored in triple level cells could include two sub-entries for nonvolatile memory devices 120 and 150, the second entry of the second mapping table associated weight data stored in dual-level cells could include two sub-entries for nonvolatile memory devices 130 and 160, and the third entry of the second mapping table associated with weight data stored in single level cells could include two sub-entries for nonvolatile memory devices 140 and 170. In an alternate embodiment, only two types of cells are present, such as single level cells and dual-level cells, triple level cells and single level cells, single level cells and dual-level cells, etc. For example, nonvolatile memory devices 120 and 150 can be omitted while retaining nonvolatile memory devices 130, 140, 160, and 170; nonvolatile memory devices 130 and 160 can be omitted while retaining nonvolatile memory devices 120, 140, 150, and 170, etc.

Figure 9:
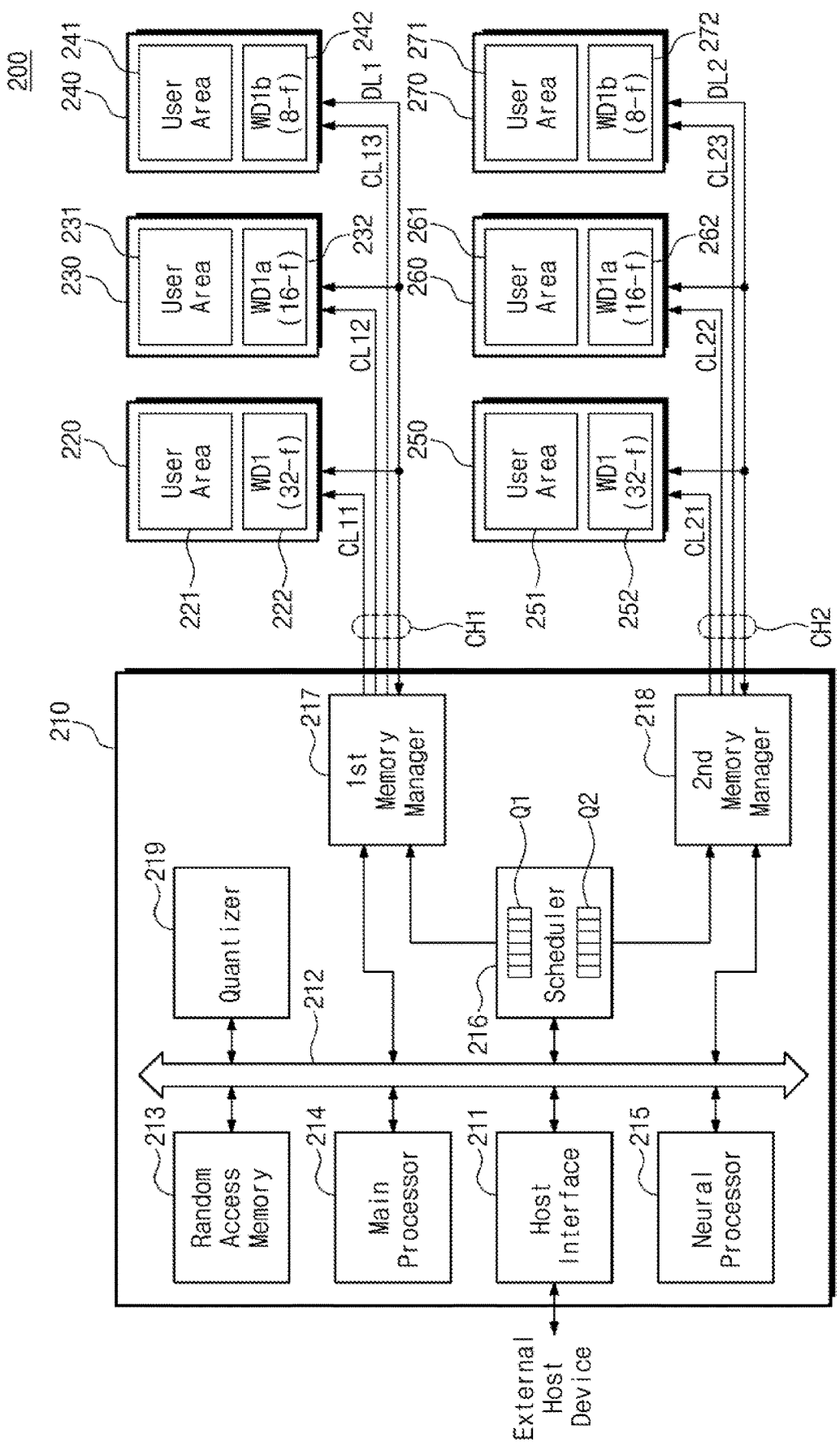
FIG. 9 is an example of a storage device storing weight data of different versions.

FIG. 9 is an example of a storage device 200 that stores pieces of weight data of different versions. Referring to FIG. 9, the storage device 200 includes a controller 210 and first to sixth nonvolatile memory devices 220 to 270.

The controller 210 may include a host interface 211, a bus 212, a random access memory 213, a main processor 214, a neural processor 215, a scheduler 216, a first memory manager 217, a second memory manager 218, and a quantizer 219 (e.g., quantizer circuit). Compared with the storage device 110 of FIG. 1, the controller 210 may further include the quantizer 219. With regard to duplicate components, additional description will be omitted to avoid redundancy.

The controller 210 may designate user areas 221, 231, and 241 and weight areas 222, 232, and 242 at the first to third nonvolatile memory devices 220 to 240 of the first channel CH1. Also, the controller 210 may designate user areas 251, 261, and 271 and weight areas 252, 262, and 272 at the fourth to sixth nonvolatile memory devices 250 to 270 of the second channel CH2.

The first weight data WD1 may be stored in the weight area 222 of the first nonvolatile memory device 220 of the first channel CH1, and degraded versions WD1a and WD1b of the first weight data WD1 may be stored in the weight areas 232 and 242 of the second and third nonvolatile memory devices 230 and 240 of the first channel CH1.

Likewise, the first weight data WD1 may be stored in the weight area 252 of the fourth nonvolatile memory device 250 of the second channel CH2, and the degraded versions WD1a and WD1b of the first weight data WD1 may be stored in the weight areas 262 and 272 of the fifth and sixth nonvolatile memory devices 260 and 270 of the second channel CH2.

The degraded versions WD1a and WD1b may be "quantized versions" of the first weight data WD1, which are generated by the quantizer 219. For example, when the first weight data WD1 is written in the storage device 100 by the external host device, the quantizer 219 may generate degraded versions of the first weight data WD1. The controller 210 may store the first weight data WD1 and the degraded data WD1a and WD1b generated by the quantizer 219 in the weight areas 222, 232, 242, 252, 262, and 272.

In another example, the degraded data WD1a and WD1b may be generated by the external host device and may be received from the external host device. The controller 210 may store the first weight data WD1 and the degraded data WD1a and WD1b received from the external host device in the weight areas 222, 232, 242, 252, 262, and 272. In this case, the quantizer 219 may be omitted.

In an embodiment, the first weight data WD1 is 32-bit floating point data 32-f, the degraded data WD1a is 16-bit fixed point data 16-f, and the degraded data WD1b is 8-bit fixed point data 8-f. For example, the first weight data WD1 may represent weight data with a first accuracy level, the degraded weight data WD1a may represent the same weight data with a second accuracy level lower than the first accuracy level, and the degraded weight data WD1b may represent the same weight data with a third accuracy level lower than the second accuracy level. For example, the first weight data WD1 may include a first number of bits to represent the weight data, the degraded weight data WD1a may include a second number of bits lower than the first number to represent the same weight data, and the degraded data WD1b may include a third number of bits lower than the second number to represent the same weight data. For example, the first number could equal 32, the second number could equal 16, and the third number could equal 8, but the inventive concept is not limited thereto.

The first weight data WD1 may support the highest accuracy of inference but may have the longest read time. The degraded data WD1a may support the accuracy of inference lower than the first weight data WD1 and may have a shorter read time than the first weight data WD1. The degraded data WD1b may support the accuracy of inference lower than the degraded data WD1a and may have a shorter read time than the degraded data WD1a.

The scheduler 216 may select a colder channel for reading weight data from among the first channel CH1 and the second channel CH2. The scheduler 216 may select one of the first weight data WD1 and the degraded data WD1a and WD1b of the selected channel, based on the selected work load.

For example, when a work load becomes smaller (e.g., is smaller than a first threshold), the scheduler 216 may select the first weight data WD1. When a work load becomes greater (e.g., is greater than the first threshold), the scheduler 216 may select the degraded data WD1b. The scheduler 216 may generate a read command and an address for the selected data.

As described with reference to FIGS. 4 and 7, the scheduler 216 may refer to the second mapping table. The second mapping table may map physical addresses of weight areas having different characteristics (e.g., being not degraded or being degraded with different levels) onto one virtual address indicating one weight data. For example, the second mapping table could include a first entry for a first virtual address for the first weight data WD1 stored in the first number of bits, a second entry for a second virtual address for the degraded weight data WD1a stored in the second number of bits, and a third entry for a third virtual address for the degraded weight data WD1b stored in the third number of bits.

In an embodiment, as described with reference to FIG. 6, two or more replicas of weight data may be respectively stored in weight areas of the first channel CH1 and the second channel CH2. For example, the first entry associated with weight data represented by the first number of bits could include two sub-entries for nonvolatile memory devices 220 and 250, the second entry associated with the weight data represented by the second number of bits could include two sub-entries for nonvolatile memory devices 230 and 260, and the third entry associated with the weight data represented by the third number of bits could include two sub-entries for nonvolatile memory devices 240 and 270. In an alternate embodiment, weight data of only two accuracy levels are present, such as 32-bit and 16-bit floating point, 32-bit and 8-bit floating point, etc.

In an embodiment, as described with reference to FIG. 8, a weight area may be designated to have different characteristics (e.g., triple level cells, dual-level cells, or single level cells). Weight areas having different characteristics and weight data having different characteristics may be combined.

For example, the first weight data WD1 having the longest read time may be stored in a weight area of triple level cells or single level cells. The degraded data WD1b having the shortest read time may be stored in a weight area of single level cells or triple level cells.

Figure 10:
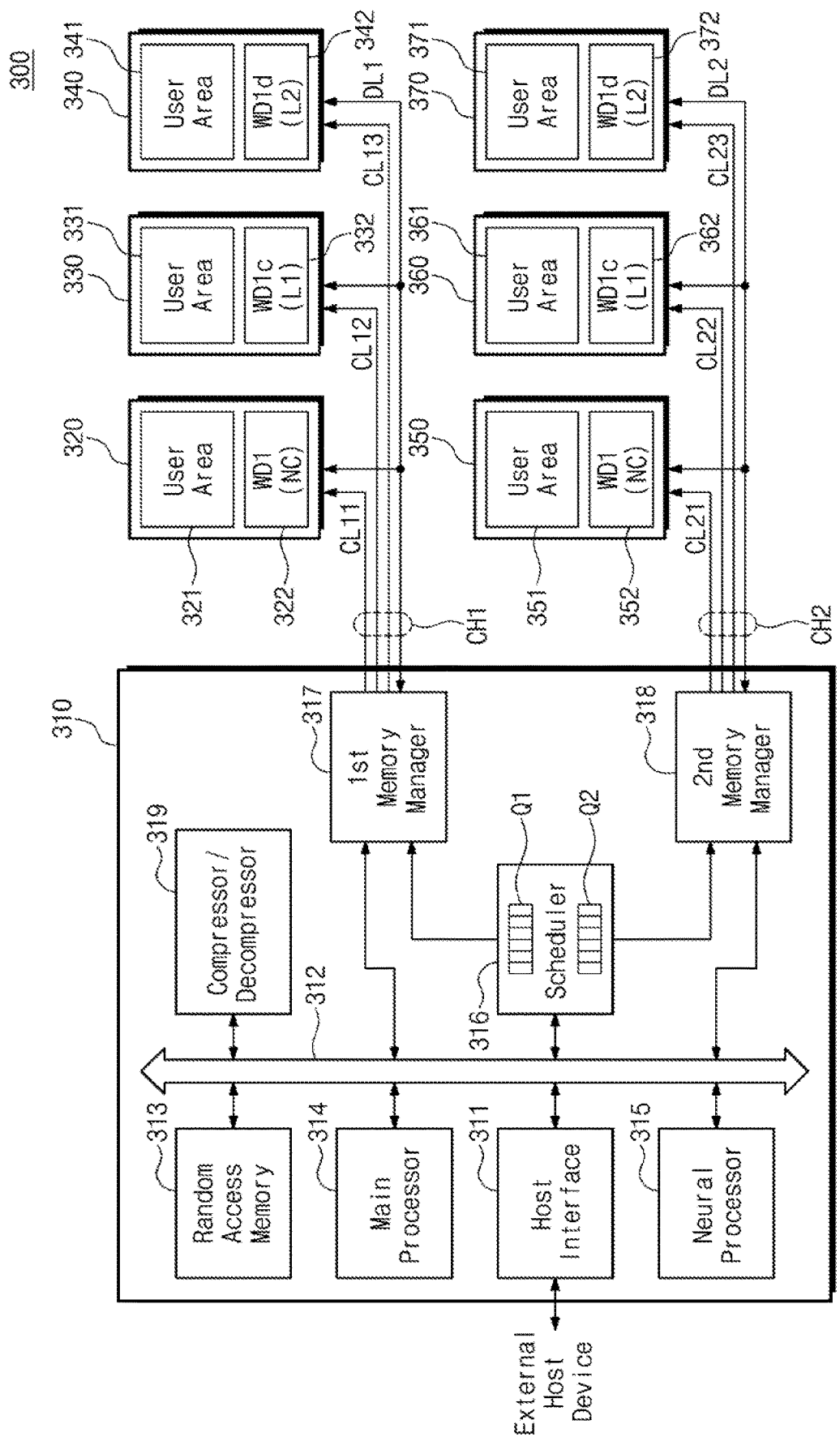
FIG. 10 is an example of a storage device storing weight data of different versions.

FIG. 10 is an example of a storage device 300 storing weight data of different versions. Referring to FIG. 9, the storage device 300 includes a controller 310 and first to sixth nonvolatile memory devices 320 to 370.

The controller 310 may include a host interface 311, a bus 312, a random access memory 313, a main processor 314, a neural processor 315, a scheduler 316, a first memory manager 317, a second memory manager 318, and a compressor/decompressor 319. Compared with the storage device 110 of FIG. 1, the controller 310 may further include the compressor/decompressor 319. With regard to duplicate components, additional description will be omitted to avoid redundancy.

The controller 310 may designate user areas 321, 331, and 341 and weight areas 322, 332, and 342 at the first to third nonvolatile memory devices 320 to 340 of the first channel CH1. Also, the controller 310 may designate user areas 351, 361, and 371 and weight areas 352, 362, and 372 at the fourth to sixth nonvolatile memory devices 350 to 370 of the second channel CH2.

The first weight data WD1 may be stored in the weight area 322 of the first nonvolatile memory device 320 of the first channel CH1, and compression versions WD1c and WD1d of the first weight data WD1 may be stored in the weight areas 332 and 342 of the second and third nonvolatile memory devices 330 and 340 of the first channel CH1.

Likewise, the first weight data WD1 may be stored in the weight area 352 of the fourth nonvolatile memory device 350 of the second channel CH2, and compression versions WD1c and WD1d of the first weight data WD1 may be stored in the weight areas 362 and 372 of the fifth and sixth nonvolatile memory devices 360 and 370 of the second channel CH2.

The compression versions WD1c and WD1d may be "compressed versions" of the first weight data WD1, which are generated by the compressor/decompressor 319. For example, when the first weight data WD1 are written in the storage device 100 by the external host device, the compressor/decompressor 319 may generate compression versions of the first weight data WD1. The compressor/decompressor 319 may include a compressor (e.g., a compression circuit) and a decompressor (e.g., a decompression circuit). The controller 310 may store the first weight data WD1 being not compressed (NC) and the compressed data WD1c and WD1d generated by the compressor/decompressor 319 in the weight areas 322, 332, 342, 352, 362, and 372.

In another example, the compressed data WD1c and WD1d may be generated by the external host device and may be received from the external host device. The controller 310 may store the first weight data WD1 and the compressed data WD1c and WD1d received from the external host device in the weight areas 322, 332, 342, 352, 362, and 372. In this case, the compressor/decompressor 319 may be replaced with a decompressor.

In an embodiment, the compressed data WD1c may be data that is compressed with a first level L1. The compressed data WD1d may be data that is compressed with a second level L2. For example, the compression of the first level L1 may be lossy compression, and the compression of the second level L2 may be lossless compression. In another exemplary embodiment, the first weight data WD1 was compressed using a first lossless compression technique to generate compressed data WD1c and the first weight data WD1 was compressed using a second other lossless compression technique to generate compressed data WD1d. In another exemplary embodiment, the first weight data WD1 was compressed using a first lossy compression technique to generate compressed data WD1c and the first weight data WD1 was compressed using a second other lossy compression technique to generate compressed data WD1d.

The first weight data WD1 may require the longest read time but may not require a time for decompression. The compressed data WD1c may require a read time shorter than the first weight data WD1 but may require a decompression time. The compressed data WD1d may require a read time shorter than the compressed data WD1c but may require a decompression time longer than the compressed data WD1c.

The scheduler 316 may select a colder channel for reading weight data from among the first channel CH1 and the second channel CH2. The scheduler 316 may select one of the first weight data WD1 and the compressed data WD1c and WD1d of the selected channel, based on a work load of the selected channel.

For example, when a work load becomes smaller (e.g., is smaller than a first threshold), the scheduler 316 may select the first weight data WD1. When a work load becomes greater (e.g., is greater than a second threshold), the scheduler 316 may select the compressed data WD1d. When a work load is intermediate level, the scheduler 316 may select the compressed data WD1c. The scheduler 316 may generate a read command and an address for the selected data.

As described with reference to FIGS. 4 and 7, the scheduler 316 may refer to the second mapping table. The second mapping table may map physical addresses of weight areas having different characteristics (e.g., being not compressed or being compressed with different levels) onto one virtual address indicating one weight data. For example, the second mapping table could include a first entry for a first virtual address for the first weight data WD1 without compression, a second entry for a second virtual address for the compression weight data WD1c compressed with a first level, and a third entry for a third virtual address for the compression weight data WD1d compressed with a second level.

In an embodiment, as described with reference to FIG. 6, two or more replicas of weight data may be respectively stored in weight areas of the first channel CH1 and the second channel CH2. For example, the first entry of the second mapping table associated with the uncompressed weight data WD1 could include two sub-entries for nonvolatile memory devices 320 and 350, the second entry of the second mapping table associated with the compression weight data WD1c could include two sub-entries for nonvolatile memory devices 330 and 360, and the third entry of the second mapping table associated with the compression weight data WD1d could include two sub-entries for nonvolatile memory devices 340 and 370. In an alternate embodiment, only uncompressed weight data and one type of compressed weight data are present.

In an embodiment, as described with reference to FIG. 8, a weight area may be designated to have different characteristics (e.g., triple level cells, dual-level cells, or single level cells). Weight areas having different characteristics and weight data having different characteristics may be combined.

For example, the first weight data WD1 having the longest read time may be stored in a weight area of triple level cells or single level cells. The compressed data WD1d having the shortest read time may be stored in a weight area of single level cells or triple level cells.

In an embodiment, as described with reference to FIG. 9, the first weight data WD1 may be variously quantized. The first weight data WD1, a version obtained by compressing the first weight data WD1 with at least one level, a version obtained by degrading the first weight data WD1 with at least one level, and a version obtained by degrading the first weight data WD1 with at least one level and then compressing the degraded data with at least one level may be variously stored in the weight areas 322, 332, 342, 352, 362, and 372.

Figure 11:
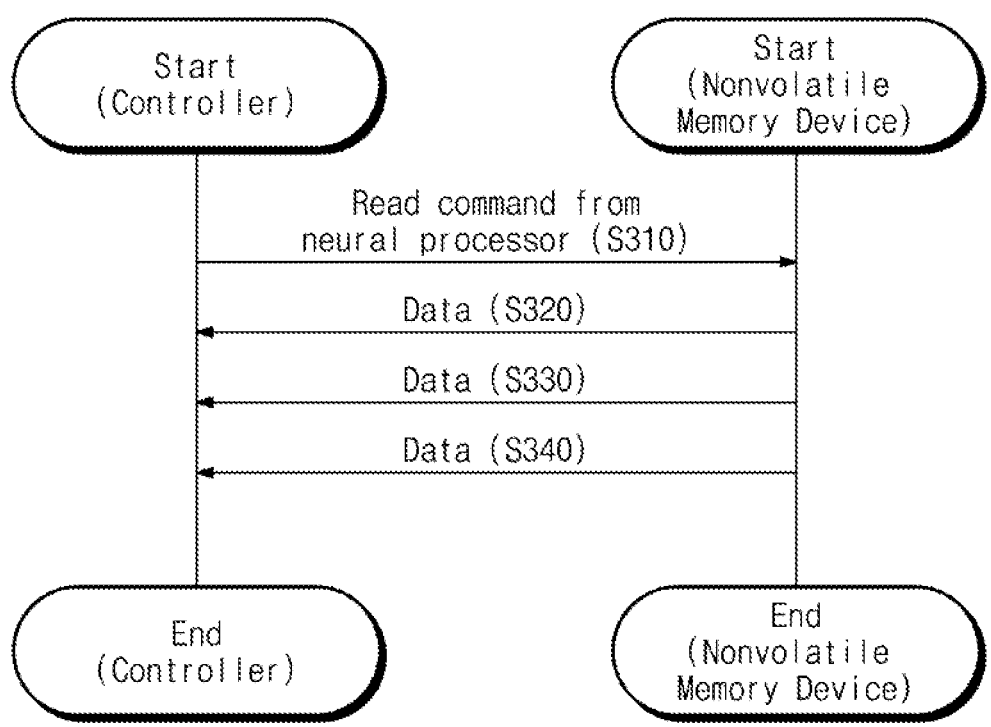
FIG. 11 illustrates an example in which a storage device reads weight data.

FIG. 11 illustrates an example in which the storage device 100 reads weight data. Referring to FIGS. 1 and 11, the controller 110 may transfer a pair of a read command and an address generated from the neural processor 115 to a nonvolatile memory device, which is selected to read the first weight data WD1, from among the first to sixth nonvolatile memory devices 120 to 170.

For example, the amount of data that is read by the read command and the address generated from the neural processor 115 may be greater than the amount of data that is read by a read command and an address generated from the main processor 114. For example, in the case where the read command and the address generated from the main processor 114 are transferred to the selected nonvolatile memory device, the controller 110 may receive data through a single data output sequence. In contrast, in the case where the read command and the address generated from the neural processor 115 are transferred to the selected nonvolatile memory device, the controller 110 may receive data through three data output sequences in operation S320 to operation S340.

In an embodiment, in response to the read command and the address generated from the neural processor 115, the controller 110 may receive data from the selected nonvolatile memory device through "K" data output sequences (K being a positive integer).

Figure 12:
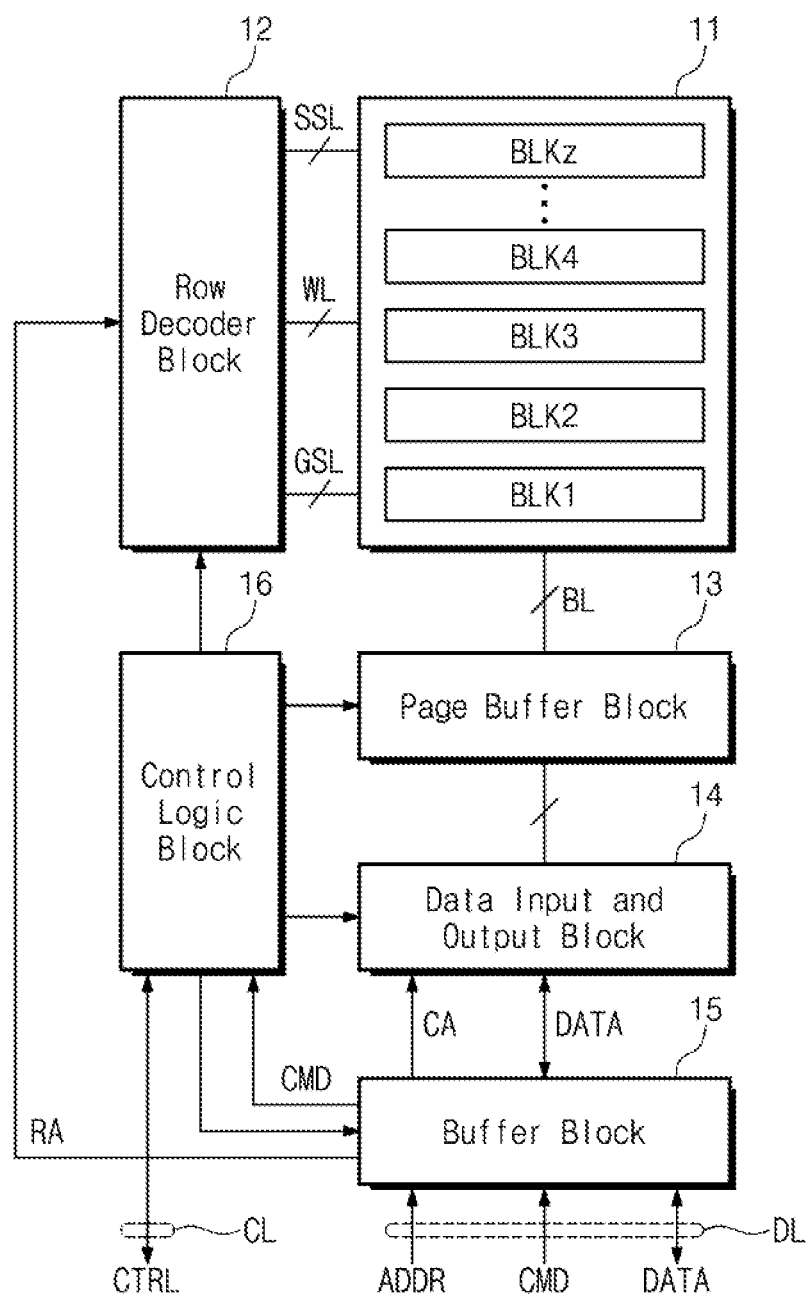
FIG. 12 is a block diagram illustrating an exemplary nonvolatile memory device.

FIG. 12 is a block diagram illustrating an exemplary nonvolatile memory device 10. For example, the nonvolatile memory device 10 may be one of the first to sixth nonvolatile memory devices 120 to 170.

Referring to FIG. 12, the nonvolatile memory device 10 includes a memory cell array 11, a row decoder block 12 (e.g., a row decoder circuit), a page buffer block 13 (e.g., a page buffer), a data input and output block 14 (e.g., data input/output circuit), a buffer block 15 (e.g., a buffer circuit), and a control logic block 16 (e.g., a logic circuit).

The memory cell array 11 includes a plurality of memory blocks BLK1 to BLKz. Each of the memory blocks BLK1 to BLKz includes a plurality of memory cells. Each of the memory blocks BLK1 to BLKz may be connected to the row decoder block 12 through at least one or more ground selection lines GSL, word lines WL, and at least one or more string selection lines SSL. Some of the word lines WL may be used as dummy word lines. Each memory block may be connected to the page buffer block 13 through a plurality of bit lines BL. The plurality of memory blocks BLK1 to BLKz may be connected in common to the plurality of bit lines BL.

In an embodiment, each of the plurality of memory blocks BLK1 to BLKz may correspond to a unit of an erase operation. The memory cells belonging to each memory block may be erased at the same time. In another example, each of the plurality of memory blocks BLK1 to BLKz may be divided into a plurality of sub-blocks. Each of the plurality of sub-blocks may correspond to a unit of an erase operation.

The row decoder block 12 is connected to the memory cell array 11 through the ground selection lines GSL, the word lines WL, and the string selection lines SSL. The row decoder block 12 operates under control of the control logic block 16.

The row decoder block 12 may decode a row address RA received from the buffer block 15 and may control voltages to be applied to the string selection lines SSL, the word lines WL, and the ground selection lines GSL based on the decoded row address.

The page buffer block 13 is connected to the memory cell array 11 through the plurality of bit lines BL. The page buffer block 13 is connected with the data input and output block 14 through a plurality of data lines DL. The page buffer block 13 operates under control of the control logic block 16.

In a write operation, the page buffer block 13 may store data to be written in memory cells. The page buffer block 13 may apply voltages to the plurality of bit lines BL based on the stored data. In a read operation or in a verify read operation that is performed in the write operation or an erase operation, the page buffer block 13 may sense voltages of the bit lines BL and may store the sensing result.

The data input and output block 14 is connected with the page buffer block 13. The data input and output block 14 may receive a column address CA from the buffer block 15. The data input and output block 14 may output data read by the page buffer block 13 to the buffer block 15 depending on the column address CA. The data input and output block 14 may provide data received from the buffer block 15 to the page buffer block 13, based on the column address CA.

The buffer block 15 may receive a command CMD and an address ADDR from an external device and may exchange data "DATA" with the external device. The buffer block 15 may operate under control of the control logic block 16. The buffer block 15 may transfer the command CMD to the control logic block 16. The buffer block 15 may transfer the row address RA of the address ADDR to the row decoder block 12 and may transfer the column address CA of the address ADDR to the data input and output block 14. The buffer block 15 may exchange the data "DATA" with the data input and output block 14.

The control logic block 16 may exchange a control signal CTRL from the external device through control lines CL. The control logic block 16 may allow the buffer block 15 to route the command CMD, the address ADDR, and the data "DATA".

The control logic block 16 may decode the command CMD received from the buffer block 15 and may control the nonvolatile memory device 10 depending on the decoded command.

Figure 13:
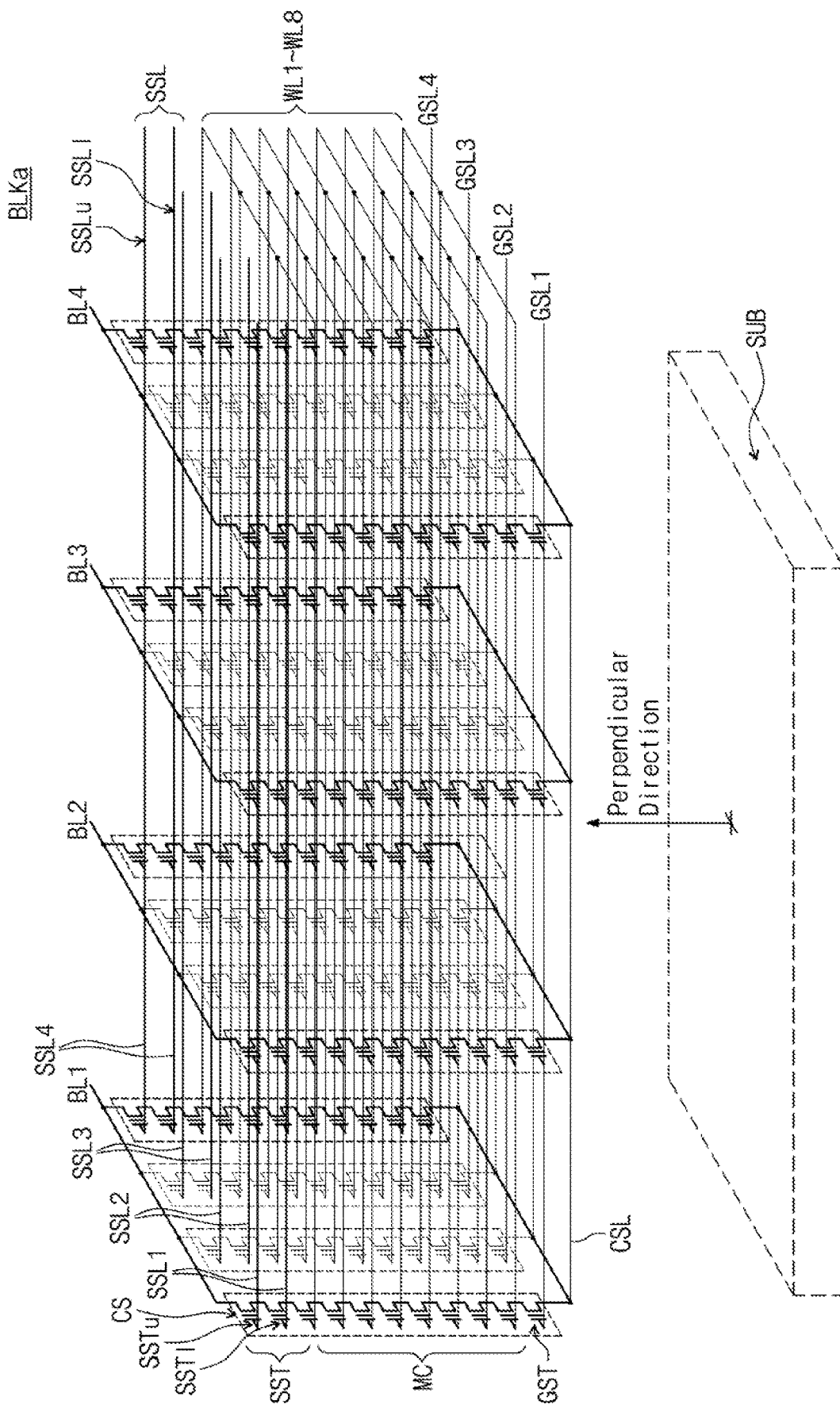
FIG. 13 is a circuit diagram illustrating an example of one memory block of memory blocks of FIG. 12.

FIG. 13 is a circuit diagram illustrating an example of one memory block BLKa of the memory blocks BLK1 to BLKz of FIG. 12. Referring to FIGS. 12 and 13, a plurality of cell strings CS may be arranged on a substrate SUB in rows and columns. The plurality of cell strings CS may be connected in common to a common source line CSL formed on (or in) the substrate SUB. In FIG. 13, a position of the substrate SUB is illustrated to clarify a structure of the memory block BLKa.

The cell strings CS of each row may be connected in common to the ground selection line GSL and to the corresponding string selection line of first to fourth string selection lines SSL1 to SSL4. Cell strings of each column may be connected to a corresponding one of first to fourth bit lines BL1 to BL4.

Each of the cell strings CS may include at least one ground selection transistor GST connected to the ground selection line GSL, a plurality of memory cells MC respectively connected to a plurality of word lines WL1 to WL8, and string selection transistors SST respectively connected to the string selection lines SSL1, SSL2, SSL3, or SSL4.

For example, a string selection transistor closer to the bit lines BL1 to BL4 from among the string selection transistors SST may be an upper string selection line and may be marked with "SSTu" using a reference sign of "u". A string selection transistor closer to the memory cells MC from among the string selection transistors SST may be a lower upper string selection line and may be marked with "SST1" using a reference sign of "1".

In each cell string CS, the ground selection transistor GST, the memory cells MC1 to MC8, and the string selection transistors SST may be connected in series along a direction perpendicular to the substrate SUB and may be sequentially stacked along the direction perpendicular to the substrate SUB. In each of the cell strings CS, at least one of the memory cells MC1 to MC8 may be used as a dummy memory cell. The dummy memory cell may not be programmed (e.g., may be program-inhibited) or may be programmed differently from the remaining memory cells of memory cells MC1 to MC8 other than the dummy memory cell.

Figure 14:
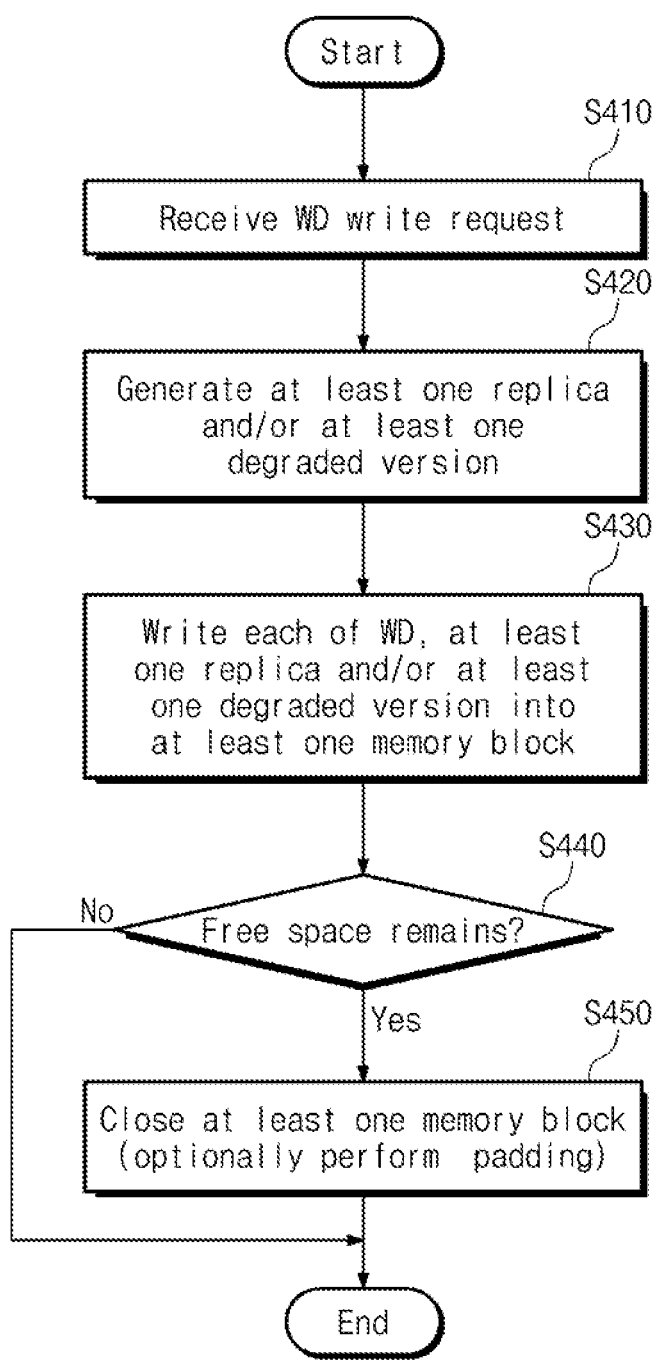
FIG. 14 illustrates an example in which a storage device writes weight data in a nonvolatile memory device.

FIG. 14 illustrates an example in which the storage device 100 writes weight data WD to the nonvolatile memory device 10. Referring to FIGS. 1, 12, 13, and 14, in operation S410, the controller 110 receives a write request to write the weight data WD from the external host device. The weight data WD may be received along with the write request from the host device.

In operation S420, the controller 110 generates at least one replica and/or at least one degraded (or compressed) version of the weight data WD. In operation S430, the controller 110 writes the weight data WD, the at least one replica of the weight data WD, and/or the at least one degraded (or compressed) version of the weight data WD to at least one memory block.

After the weight data WD is written, in operation S440, the controller 110 determines whether a free space is present in the at least one memory block. When it is determined that the free space is absent from the at least one memory block, the writing of the weight data WD may be terminated. When it is determined that the free space is present in the at least one memory block, operation S450 may be performed.

In operation S450, the controller 110 may close the at least one memory block. For example, the controller 110 may prevent an additional write operation from being performed on the at least one memory block. Optionally, the controller 110 may perform padding of writing dummy data in the free space of the at least one memory block.

The controller 110 may manage the one weight data WD and different data (e.g., user data or different weight data) at a different memory blocks. In an exemplary embodiment, a memory block storing weight data does not store different data other than the weight data.

The weight data WD may be a lump of sequential data. For example, the weight data may span many adjacent sequential pages of a given memory block. Accordingly, the degrees of degradation of the weight data WD or the degrees of degradation of memory cells storing the weight data WD may be similar. Since the weight data WD and different data (e.g., user data) are independently managed at memory blocks, it may be easier to manage the degree of degradation of the weight data WD. When The number of times that there is performed a garbage collection operation for solving an issue that valid data and invalid data are mixed may decrease.

In an embodiment, the lump of sequential data may further include different data, such as an operating system image, a boot image, and game data, as well as the weight data WD. The lump of sequential data may be called an "object". Data that are classified as an object may be distributed and managed into replicas and various versions of the replicas as described with reference to the weight data WD. Also, a weight area may be called an "object area".

Figure 15:
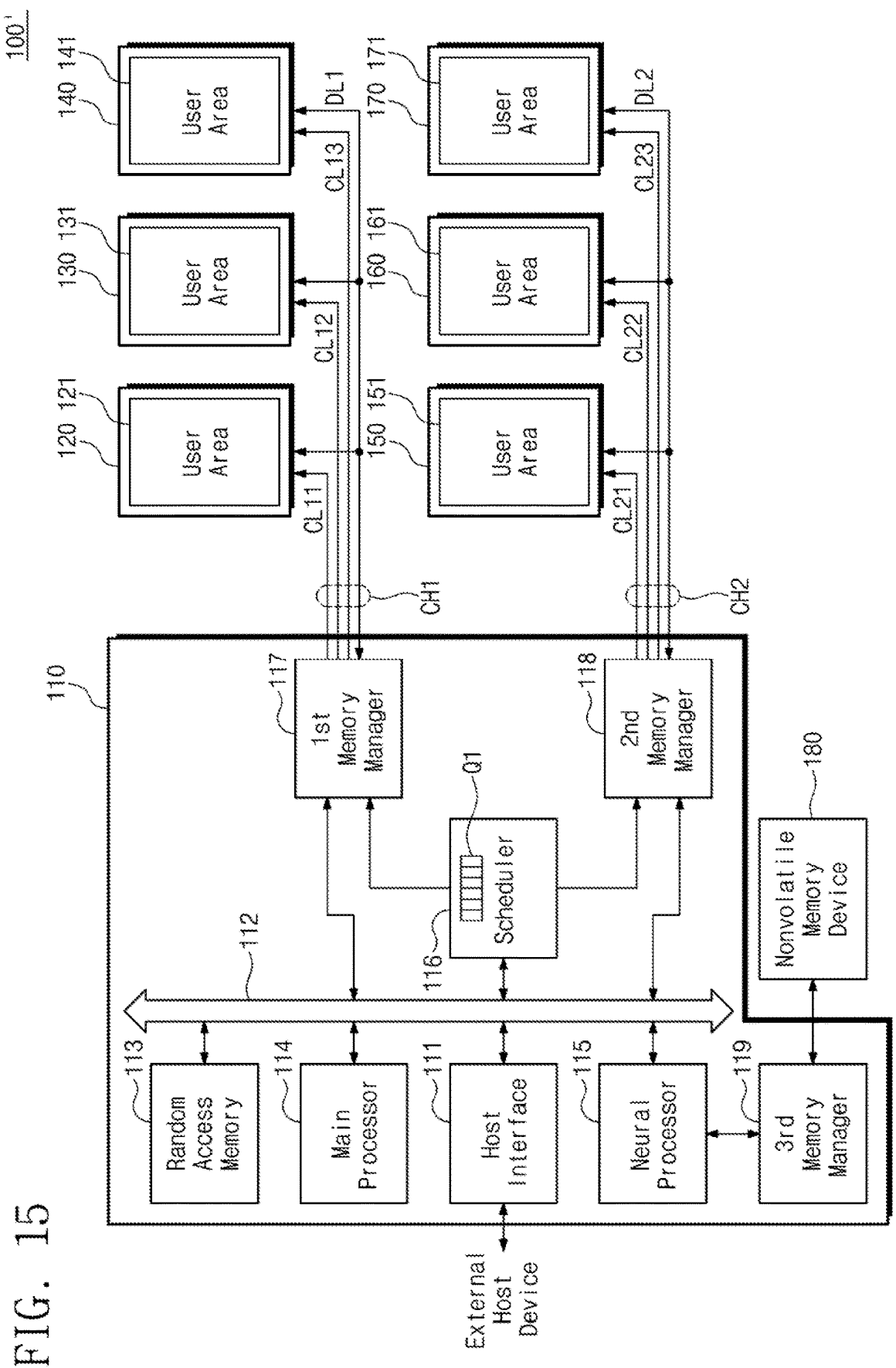
FIG. 15 illustrates an example of a storage device including a third memory manager and a nonvolatile memory device that are dedicated for a neural processor according to an exemplary embodiment of the inventive concept.
Figure 16:
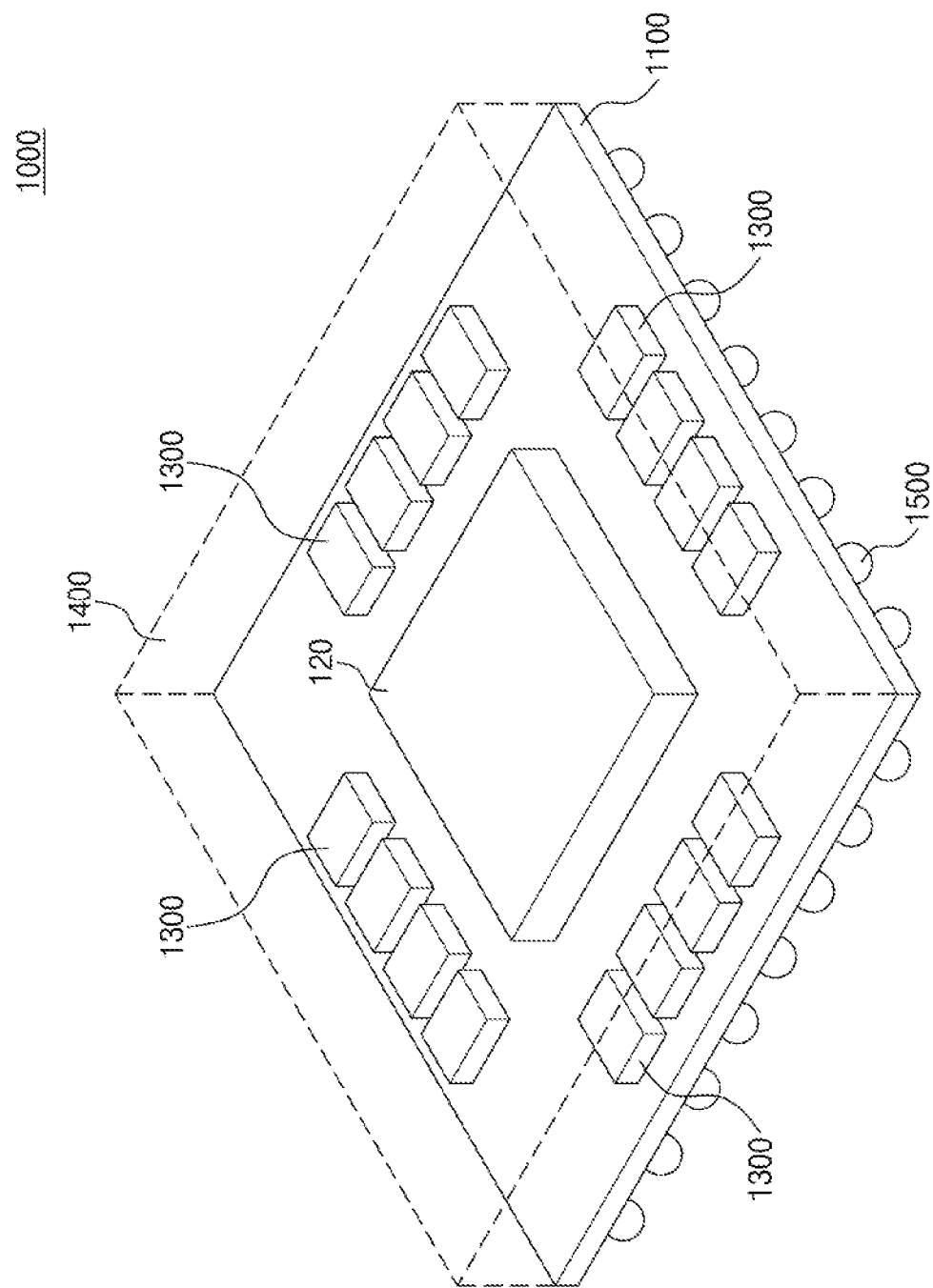
FIG. 16 illustrates an example in which a storage device according to an exemplary embodiment of the inventive concept is implemented with a package.
Figure 17:
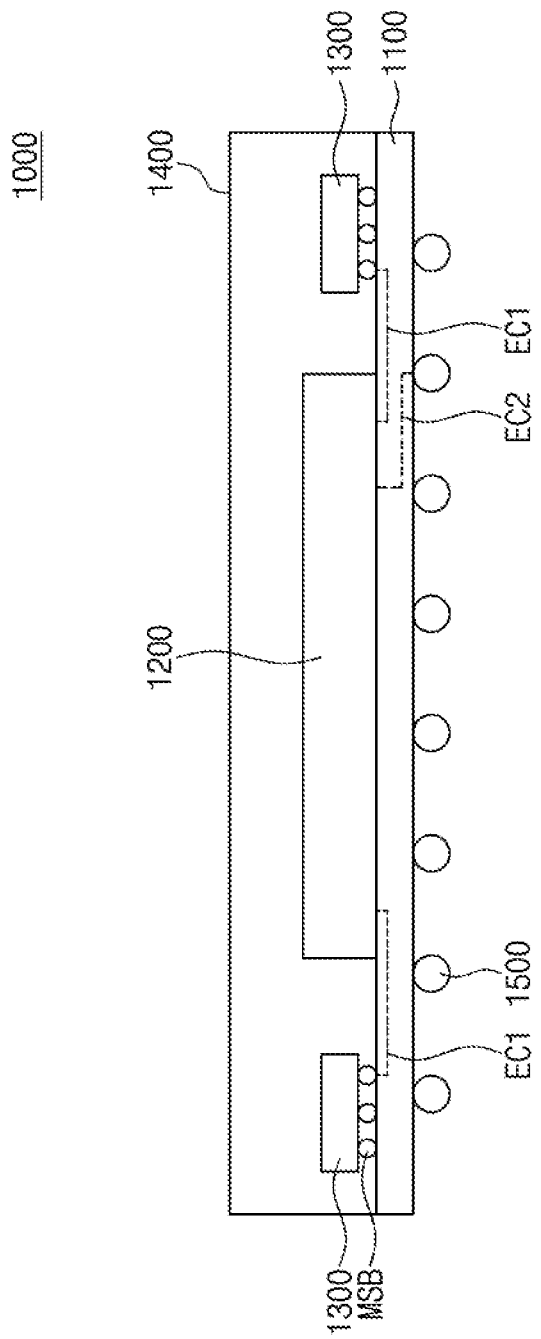
FIG. 17 is a side view of a package of FIG. 16.

FIG. 15 illustrates an example of a storage device 100' that includes a third memory manager 119 and a nonvolatile memory device 180 dedicated for the neural processor 115. Compared with FIG. 1, the neural processor 115 may access the nonvolatile memory device 180 through the third memory manager 119. The nonvolatile memory device 180 may be a dedicated device storing weight data. The scheduler 116 may not include a queue for processing a command from the neural processor 115. In a variation of FIG. 15, the nonvolatile memory device 120 additionally includes the weight area 122 of FIG. 1, the nonvolatile memory device 150 additionally includes the weight area 152 of FIG. 1, and weight data may be stored in both the nonvolatile memory device 180 and the weight areas 122 and 152. In this embodiment, the neural processor 115 first attempts to retrieve the weight data from the nonvolatile memory device 180, and if this retrieval fails, the neural processor 115 next attempts to retrieve the weight data from nonvolatile memory device 120 or nonvolatile memory device 150. For example, if the neural processor 115 fails to retrieve the weight data from the nonvolatile memory device 180, the scheduler 116 can then attempt to retrieve the weight data from the nonvolatile memory device connected to the colder channel. For example, the nonvolatile memory device 180 could be considered a cache for the weight data in this embodiment. FIG. 16 illustrates an example in which the storage device 100 according to an exemplary embodiment of the inventive concept is implemented with a package 1000. FIG. 17 is a side view of the package 1000 of FIG. 16. Referring to FIGS. 16 and 17, the package 1000 may include a package substrate 1100, a control logic chip 1200 mounted on the center of the package substrate 1100, nonvolatile memory chips 1300 mounted on the package substrate 1100 and surrounding the control logic chip 1200, a mold 1400, and solder balls 1500 under the package substrate 1100.

The package substrate 1100 may include first electrical connections EC1 connecting the control logic chip 1200 and the nonvolatile memory chips 1300, and second electrical connections EC2 connecting the control logic chip 1200 and the solder balls 1500. The control logic chip 1200 or the nonvolatile memory chips 1300 may be implemented with a flip chip attachable on the package substrate 1100, or a wafer level package.

Figure 18:
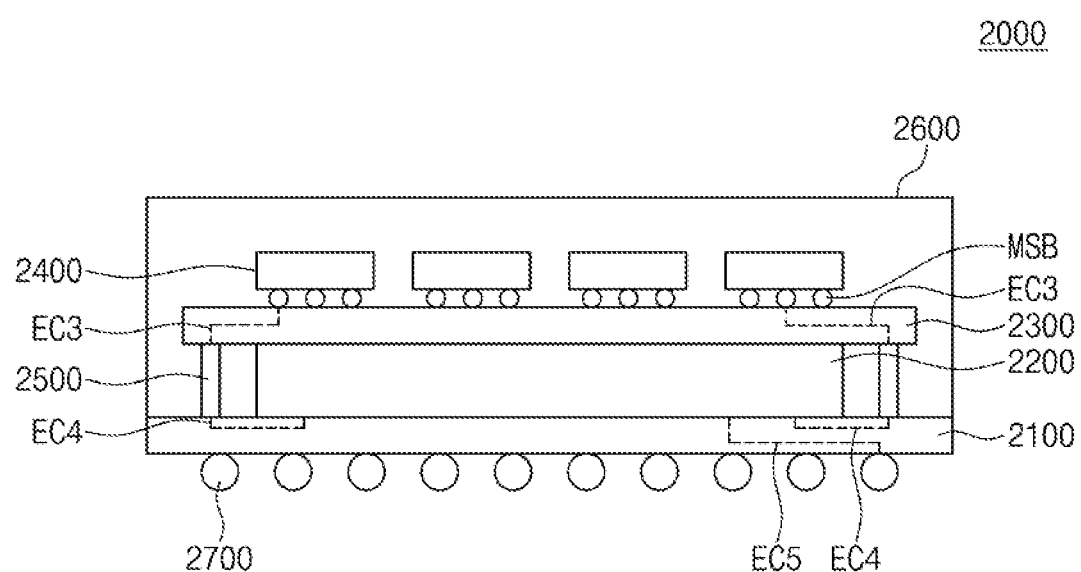
FIG. 18 illustrates another example in which a storage device according to an exemplary embodiment of the inventive concept is implemented with a package.

FIG. 18 illustrates another example in which the storage device 100 according to an exemplary embodiment of the inventive concept is implemented with a package 2000. Referring to FIG. 18, the package 2000 may include a package substrate 2100, a control logic chip 2200 on the package substrate 2100, an interposer 2300 on the control logic chip 2200, nonvolatile memory chips 2400 on the interposer 2300, side vias 2500 connecting the interposer 2300 and the package substrate 2100, a mold 2600, and solder balls 2700 under the package substrate 2100.

The nonvolatile memory chips 2400 may be connected to the control logic chip 2200 through third electrical connections EC3 of the interposer 2300, and fourth electrical connections EC4 of the package substrate 2100. The control logic chip 2200 may be connected to the solder balls 2700 through fifth electrical connections EC5 of the package substrate 2100.

According to the inventive concept, a target storage place from which weight data for machine learning are read is selected based on a read and write load of user data. Accordingly, a storage device including a machine learning function while preventing a read and write speed of user data from decreasing and an operating method of the storage device are provided.

While the inventive concept has been described with reference to exemplary embodiments thereof, it will be apparent to those of ordinary skill in the art that various changes and modifications may be made thereto without departing from the spirit and scope of the inventive concept.

What is claimed is:

1. A storage device comprising:
   a memory controller comprising a neural processing unit (NPU);
   a first nonvolatile memory (NVM) connected to the memory controller through a first channel, the first NVM storing first weight data for the NPU;
   a second NVM connected to the memory controller through a second channel, the second NVM storing second weight data for the NPU,
   wherein the memory controller is configured to determine one of the first and second channels that is less frequently accessed upon receiving an inference request, and access a corresponding one of the first weight data and the second weight data using the determined one channel in response to determining that the inference request requires accessing weight data for an operation, and
   wherein the NPU, performs the operation without using any weight data in response to determining that the inference request does not require accessing the weight data for the operation.

2. The storage device of claim 1, further comprising:
   a first memory manager connected to the first channel for accessing the first NVM;
   a second memory manager connected to the second channel for accessing the second NVM; and
   a scheduler configured to use the first memory manager to access the first weight data and the second memory manager to access the second weight data.

3. The storage device of claim 1, the first weight data is identical to the second weight data.

4. The storage device of claim 3, wherein the memory controller is configured to divide a storage area of the first NVM into a first region including first cells capable of storing a first number of bits, and divide a storage area of the second NVM into a second region including second cells capable of storing a second other number of bits, the first region storing the first weight data and the second region storing the second weight data.

5. The storage device of claim 1, wherein the memory controller is configured to degrade the first weight data into the second weight data having a lower precision.

6. The storage device of claim 1, wherein the memory controller is configured to compress the first weight data into the second weight data.

7. The storage device of claim 1, the first weight data is for a first machine learning model and the second weight data is for a second other machine learning model.

8. The storage device of claim 1, wherein each NVM comprises a plurality of cell strings arranged on a substrate in rows and columns, each of the cell strings including a ground selection transistor connected to a ground selection line GSL, a plurality of memory cells MC respectively connected to a plurality of word lines, and a plurality of string selection transistors respectively connected to a plurality of string selection lines.

9. The storage device of claim 1, wherein the memory controller further comprises a central processing unit (CPU) for processing an access request from a host device to access data of the NVM other than weight data.

10. The storage device of claim 9, wherein the memory controller further comprises:
a first queue for storing first commands associated with the access request; and
a second queue for storing second commands associated with the inference request,
wherein the memory controller determines the one channel by comparing a number of the first commands associated with the first channel with a number of the first commands associated with the second channel.

11. The storage device of claim 1, further comprising a mapping table that maps a virtual address of the inference request to a first physical address within the first NVM and to a second physical address within the second NVM, and the memory controller converts the virtual address to one of the physical addresses associated with the selected channel to perform the access.

12. A memory package comprising:
a package substrate; and
the storage device of claim 1, wherein the memory controller is disposed on a first chip on the package substrate, wherein the first NVM is disposed on a second chip on the package substrate, and wherein the second NVM is disposed on a third chip on the package substrate.

13. A storage device comprising:
a data bus;
a neural processing unit (NPU) connected to the data bus;
a first memory manager connected to the data bus and a first channel;
a second memory manager connected to the data bus and a second channel;
a first nonvolatile memory (NVM) device connected to the first channel, the first NVM storing first weight data for the NPU;
a second NVM device connected to the second channel, the second NVM storing second weight data for the NPU; and
a third memory manager connected to the NPU and a third NVM device storing third weight data for the NPU,
wherein the NPU attempts to access the third weight data using the third memory manager upon receiving an inference request from a host device in response to determining that the inference request requires accessing the weight data for an operation,
wherein the storage device attempts to access the first weight using the first memory manager or the second weight data using the second memory manager when the NPU is unable to access the third weight data through the third memory manager, and
wherein the NPU performs the operation without using any weight data in response to determining that the inference request does not require accessing the weight data for the operation.

14. The storage device of claim 13, further comprising a scheduler configured to determine one of the first and second channels that is less frequently accessed, and access a corresponding one of the first weight data and the second weight data using the determined one channel.

15. The storage device of claim 14, wherein the first weight data, the second weight data, and the third weight data are all identical.

16. The storage device of claim 14, further comprising a central processing unit (CPU) connected to the data bus for processing an access request from the host device to access data of the NVM devices other than weight data.

17. The storage device of claim 15, further comprising:
a first queue for storing first commands associated with the access request; and
a second queue for storing second commands associated with the inference request, wherein the scheduler determines the one channel by comparing a number of the first commands associated with the first channel with a number of the first commands associated with the second channel.

18. A method for operating a storage device including a memory controller and a neural processor, the method comprising:
receiving, by the memory controller, a request from a host device, wherein a first nonvolatile memory (NVM) is connected to the memory controller through a first channel and a second NVM is connected to the memory controller through a second channel;
determining, by the memory controller, whether the request requires accessing weight data for the neural processor;
processing, by the neural processor, the request when it is determined that the request does not require accessing the weight data; and
selecting, by the memory controller, one of the channels that is less frequently accessed and accessing the weight data using the selected channel when it is determined that the request requires accessing the weight data.

19. The method of claim 18, wherein the accessing of the weight data comprises:
reading the weight data from the NVM connected to the selected channel; and
outputting the read weight data to the neural processor.

20. The method of claim 19, further comprising the neural processor executing a machine learning algorithm using the weight data.

\* \* \* \* \*